US007524198B2

(12) United States Patent
Nguyen et al.

(10) Patent No.: US 7,524,198 B2
(45) Date of Patent: Apr. 28, 2009

(54) PRESS/PUSH FLASH DRIVE

(75) Inventors: David Nguyen, San Jose, CA (US); Nan Nan, San Jose, CA (US); Jim Chin-Nan Ni, San Jose, CA (US); Charles Chung Lee, Cupertino, CA (US); Ming-Shiang Shen, Taipei Hsien (TW)

(73) Assignee: Super Talent Electronics, Inc., San Jose, CA (US)

( * ) Notice: Subject to any disclaimer, the term of this patent is extended or adjusted under 35 U.S.C. 154(b) by 12 days.

(21) Appl. No.: 11/933,226

(22) Filed: Oct. 31, 2007

(65) Prior Publication Data
US 2008/0280490 A1 Nov. 13, 2008

Related U.S. Application Data

(63) Continuation-in-part of application No. 09/478,720, filed on Jan. 6, 2000, now Pat. No. 7,257,714, which is a continuation-in-part of application No. 09/366,976, filed on Aug. 4, 1999, now Pat. No. 6,547,130, application No. 11/933,226, and a continuation-in-part of application No. 11/309,594, filed on Aug. 28, 2006, now Pat. No. 7,383,362, which is a continuation-in-part of application No. 10/991,313, filed on Nov. 16, 2004, now Pat. No. 7,296,345, which is a continuation-in-part of application No. 10/707,277, filed on Dec. 2, 2003, now Pat. No. 7,103,684, application No. 11/933,226, which is a continuation-in-part of application No. 11/309,847, filed on Oct. 12, 2006, now Pat. No. 7,507,119.

(51) Int. Cl.
*H01R 13/60* (2006.01)

(52) U.S. Cl. ........................................ 439/131; 439/66

(58) Field of Classification Search ............. 439/66–67, 439/76.1, 493, 357, 528; 361/737, 752, 740, 361/801
See application file for complete search history.

(56) References Cited

U.S. PATENT DOCUMENTS

| 7,407,393 B2 | 8/2008 | Ni et al. |
| 7,420,803 B2 | 9/2008 | Hsueh et al. |
| 2007/0292009 A1* | 12/2007 | Nguyen et al. ............... 382/124 |

* cited by examiner

*Primary Examiner*—Jean F Duverne
(74) *Attorney, Agent, or Firm*—Maryam Imam

(57) ABSTRACT

Briefly, an embodiment of the present invention includes a portable flash memory drive with a simplified mechanism, based upon the resilient properties of the material used to create the parts, for reliable extension and retraction of the device's interface plug. The portable flash memory drive is comprised of a metal housing (or case), a printed circuit board (PCB) assembly, PCB support, PCB assembly end cap, an upper, and lower housing, and in some embodiments a fingerprint sensor and/or key ring assembly. The press/push switch mechanism is located on either the side of the portable flash memory device, or the top; and relies upon the resilient properties of the material used to create the metal housing or end cap, to create a smooth, locking mechanism for the extension or retraction of the interface (i.e., USB or firewire) plug. The switching/locking mechanism relies upon grooves or notches within the material of the upper and/or lower housing for tracking and locking, coupled with protrusion tabs on the sliding components of the end cap or metal housing. Alternatively, in some embodiments of the present invention, a fingerprint sensor is also extended or retracted contemporaneously with the interface plug, and allows the end user to secure and unlock the data contained, in whole or in part, therein.

22 Claims, 41 Drawing Sheets

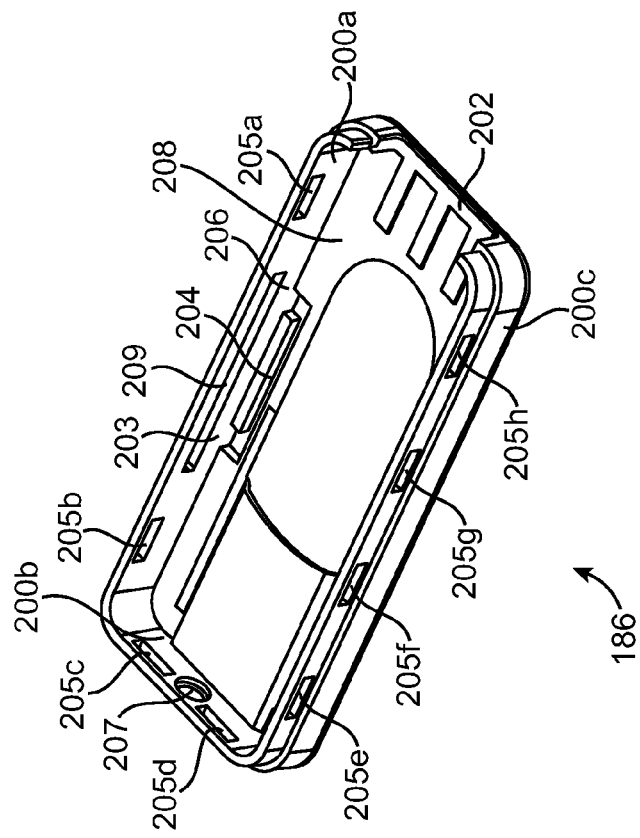
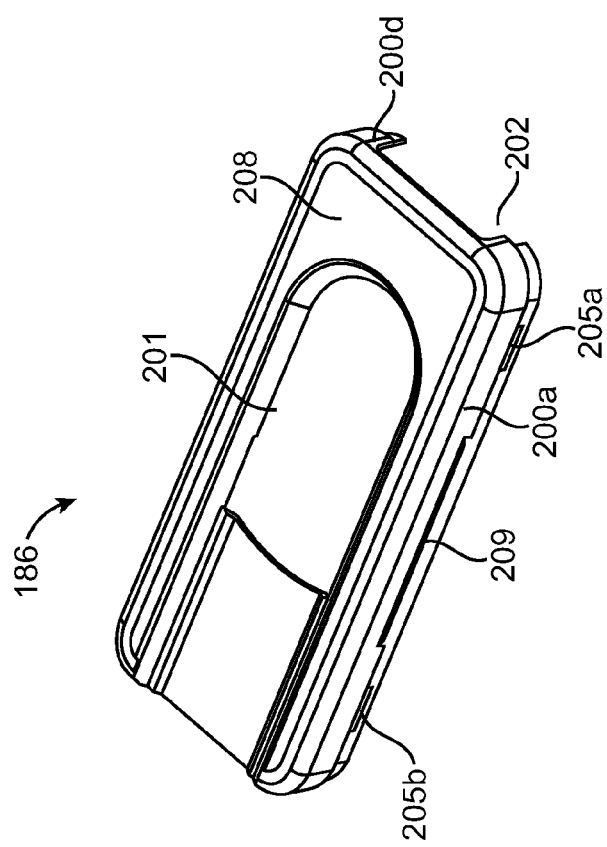
FIG. 20(b)
FIG. 20(a)

PRESS/PUSH FLASH DRIVE

CROSS REFERENCE TO RELATED APPLICATIONS

This application is a continuation in part of U.S. patent application Ser. No. 09/478,720, entitled "Electronic Data Storage Medium with Fingerprint Verification Capability," filed on Jan. 6, 2000, which claims benefit of and is a continuation in part of U.S. patent application Ser. No. 09/366,976, entitled "Integrated Circuit Card with Fingerprint Verification Capability," filed on Aug. 4, 1999, and currently issued as U.S. Pat. No. 6,547,130. This application is also a continuation in part of U.S. patent application Ser. No. 10/991,313, entitled "A Method for Manufacturing a Memory Device," filed on Nov. 16, 2004; a continuation in part of U.S. patent application Ser. No. 11/309,594, entitled "Single-Chip Multi-Media Card/Secure Digital (MMC/SD) Controller Reading Power-On Boot Code from Integrated Flash Memory for User Storage," filed on Aug. 28, 2006, which is a continuation in part of U.S. Pat. No. 7,103,684, entitled "Single-Chip USB Controller Reading Power-On Boot Code From Integrated Flash Memory for User Storage," filed on Dec. 2, 2003; and also a continuation in part of U.S. patent application Ser. No. 11/309,847, entitled "USB Device With Integrated USB Plug with USB-Substrate Supporter Inside," filed on Oct. 12, 2006. This application relates to U.S. Pat. No. 7,004,780, entitled "Portable Computer Peripheral Apparatus with Retractable Plug Connector," filed on May 13, 2004.

BACKGROUND OF THE INVENTION

1. Field of the Invention

The present invention relates to an electronic data storage medium, more particularly to an electronic data storage medium with a fingerprint verification capability, and to a standard USB flash drive with an extendable/retractable USB plug.

2. Description of the Prior Art

With the increasing prevalence of computers in our lives, from work to recreation, society became extremely reliant upon storage of information in a digital format rather than in a traditional printed format. From personal information and medical histories, to multimedia content such as music and home videos, all facets of our lives now exist as digital records rather than paper records. Because of the digital format of these records and media, they can't be duplicated or relocated in a manner consistent with traditional media.

As a result, portable formats such as the floppy disk, compact disc (CD), and digital versatile disc (DVD) emerged as ways in which information could be written by one computer, and then transported to another for use. These formats were, however, inherently limited by capacity restrictions, limited numbers of "read-write" cycles, affected by slow read/write speeds, or easily ruined by temperature physical interaction with external elements. Consequently, the falling cost of non-volatile memory, combined with its portability, reliability, and speed led it to recently emerge as the leading candidate for enabling the portability of digital information.

While non-volatile flash memory has emerged because it is quick, reliable, and extremely portable, these traits render it an ideal choice for use in portable USB devices for storing and safeguarding information in a convenient and secure manner. What is needed is an improved portable USB device.

SUMMARY OF THE INVENTION

Briefly, an embodiment of the present invention includes a portable flash memory drive with a simplified mechanism, based upon the resilient properties of the material used to create the parts, for reliable extension and retraction of the device's interface plug. The portable flash memory drive is comprised of a metal housing (or case), a printed circuit board (PCB) assembly, PCB support, PCB assembly end cap, an upper, and lower housing, and in some embodiments a fingerprint sensor and/or key ring assembly. The press/push switch mechanism is located on either the side of the portable flash memory device, or the top; and relies upon the resilient properties of the material used to create the metal housing or end cap, to create a smooth, locking mechanism for the extension or retraction of the interface (i.e., USB or firewire) plug. The switching/locking mechanism relies upon grooves or notches within the material of the upper and/or lower housing for tracking and locking, coupled with protrusion tabs on the sliding components of the end cap or metal housing. Alternatively, in some embodiments of the present invention, a fingerprint sensor is also extended or retracted contemporaneously with the interface plug, and allows the end user to secure and unlock the data contained, in whole or in part, therein.

The foregoing and other objects, features, and advantages of the present invention will be apparent from the following detailed description of the preferred embodiments which make reference to several figures of the drawing.

IN THE DRAWINGS

Figure 3B:
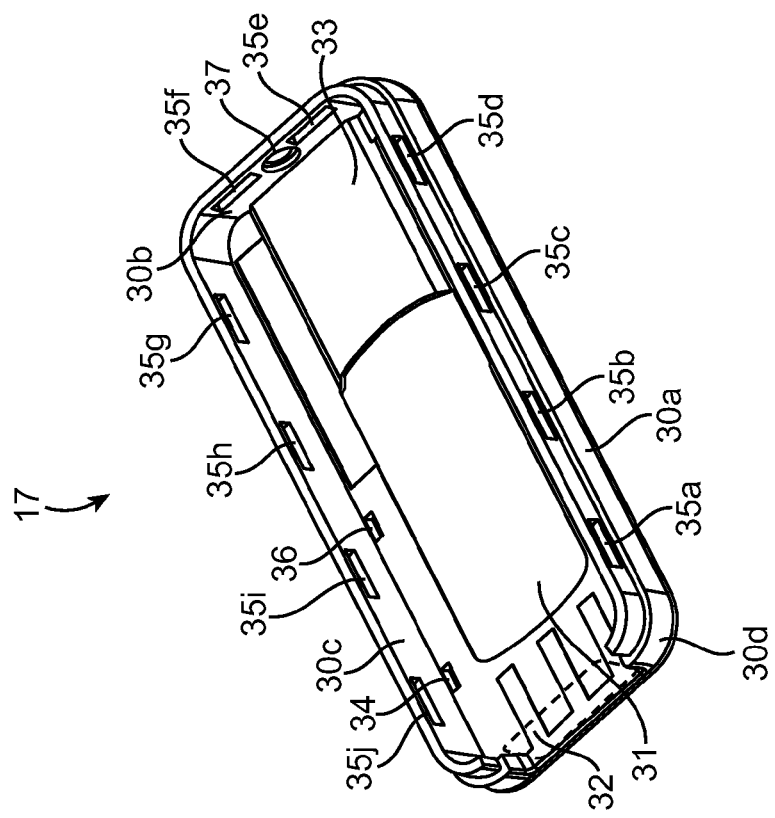
Figure 3A:
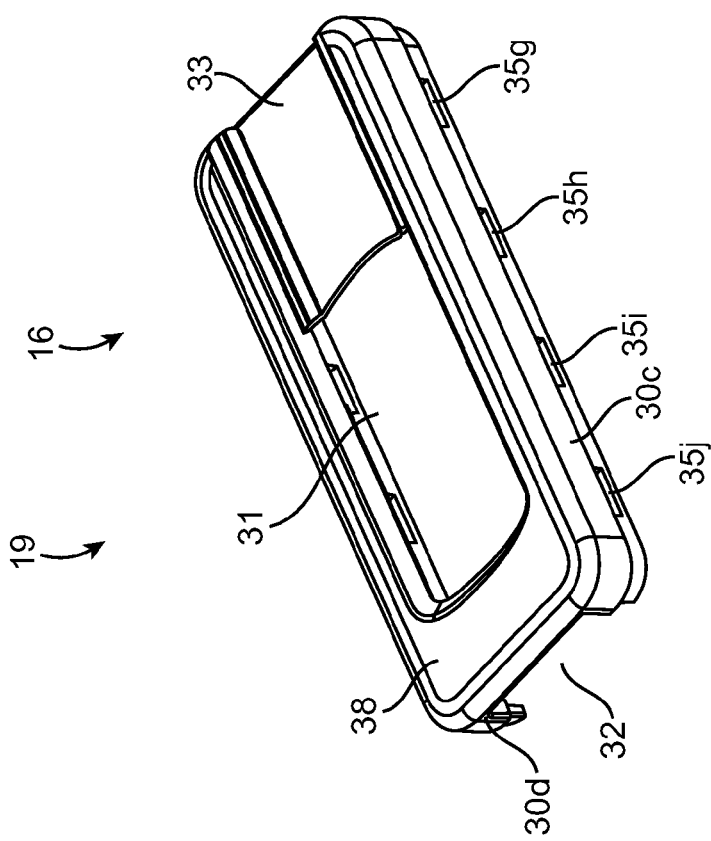

FIGS. 3(a) and 3(b) show different close-up views of the upper housing 16 of press/push flash drive 10 in an embodiment of the present invention.

Figure 4:
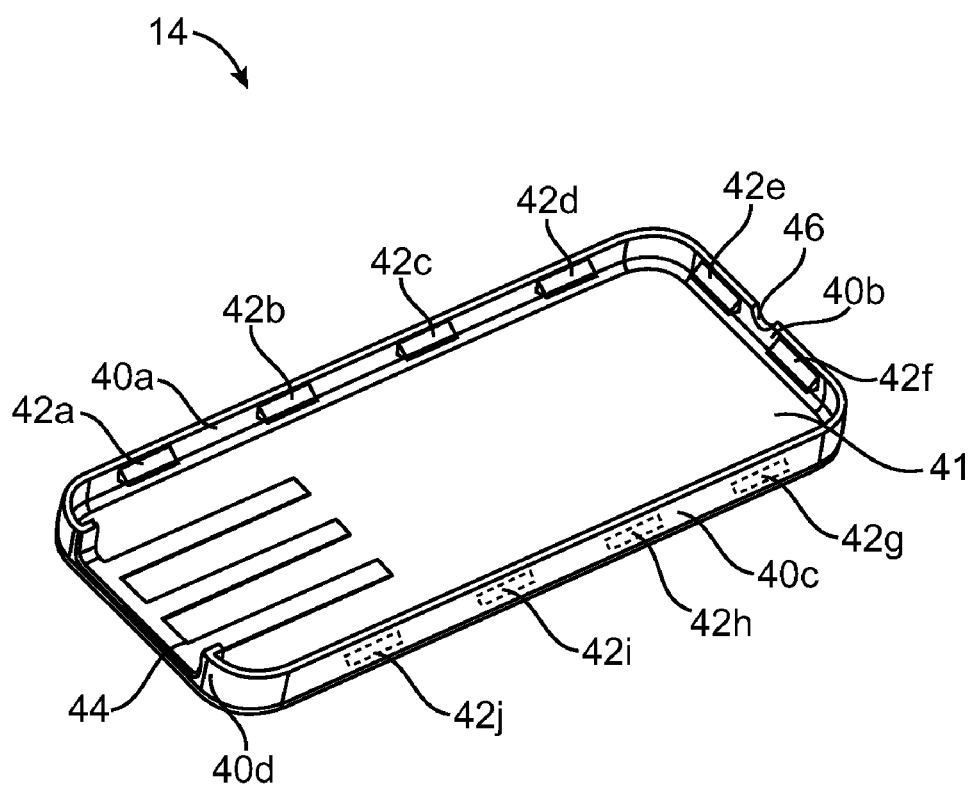

FIG. 4 shows a close-up view of the lower housing 14 of press/push flash drive 10 in an embodiment of the present invention.

Figure 5:
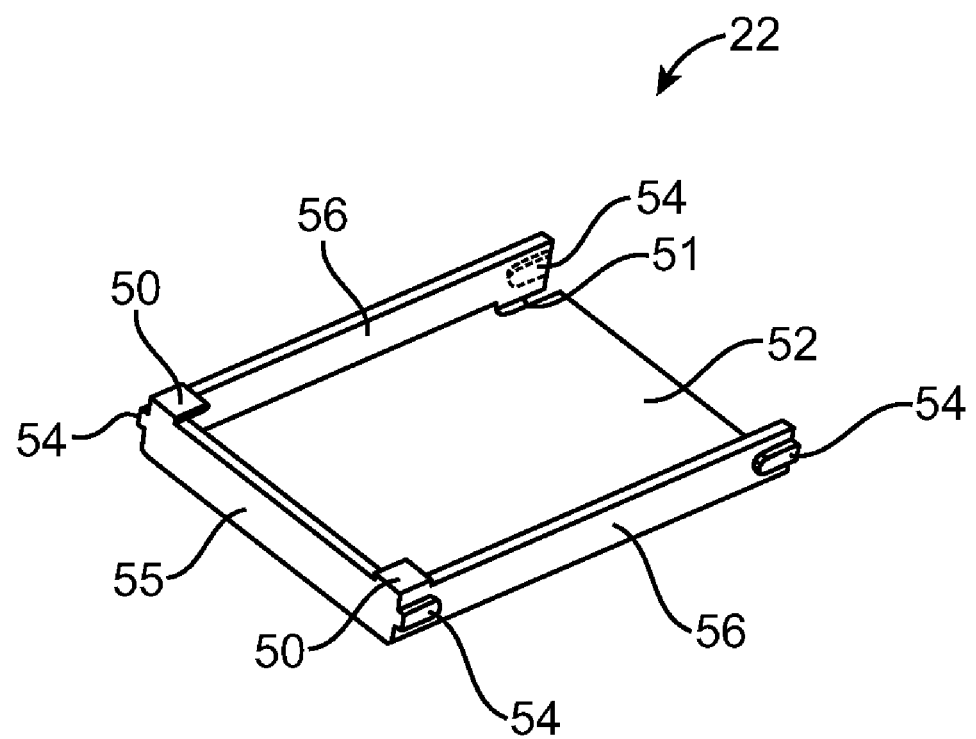

FIG. 5 shows a close-up view of the printed circuit board assembly (PCBA) support 22 of press/push flash drive 10 in an embodiment of the present invention.

Figure 6:
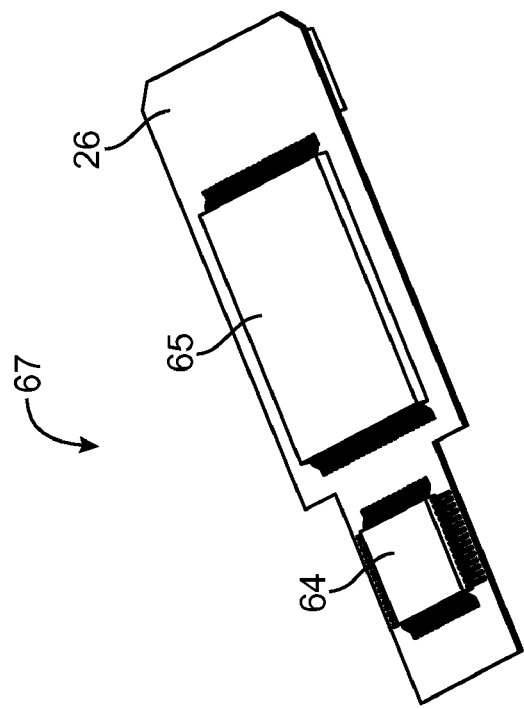
Figure 6:
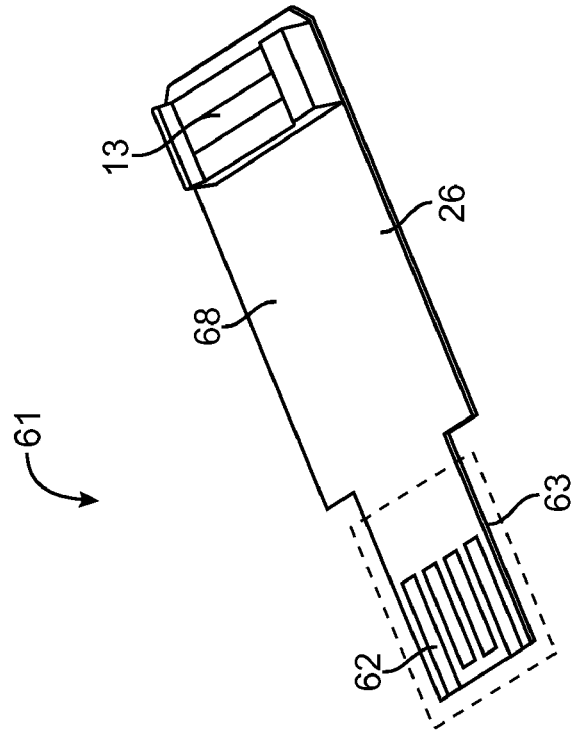

FIG. 6 shows different views of the PCBA 26 in an embodiment of the present invention.

Figure 7:
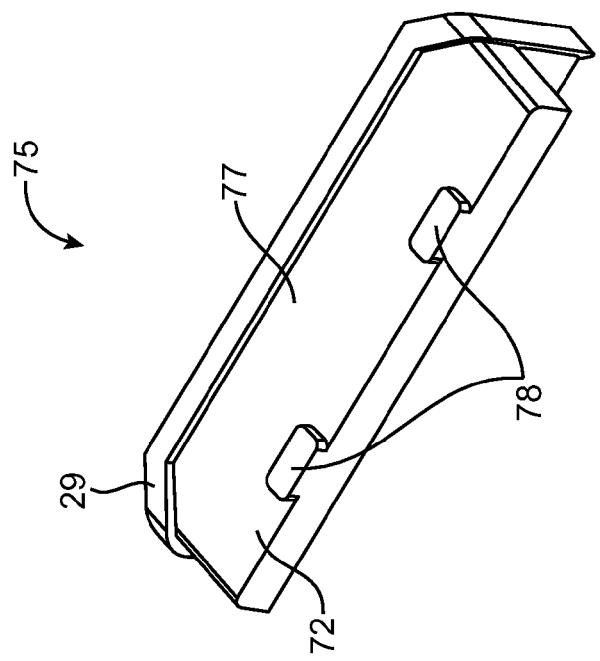
Figure 7:
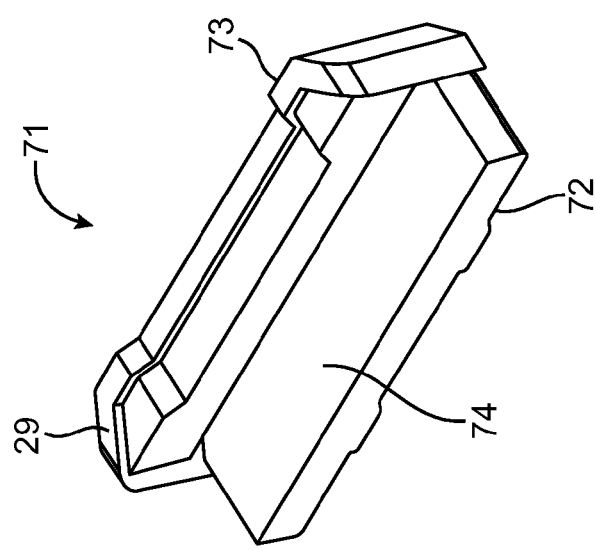

FIG. 7 shows different close-up views of end cap 29 of press/push flash drive 10 in an embodiment of the present invention.

Figure 8:
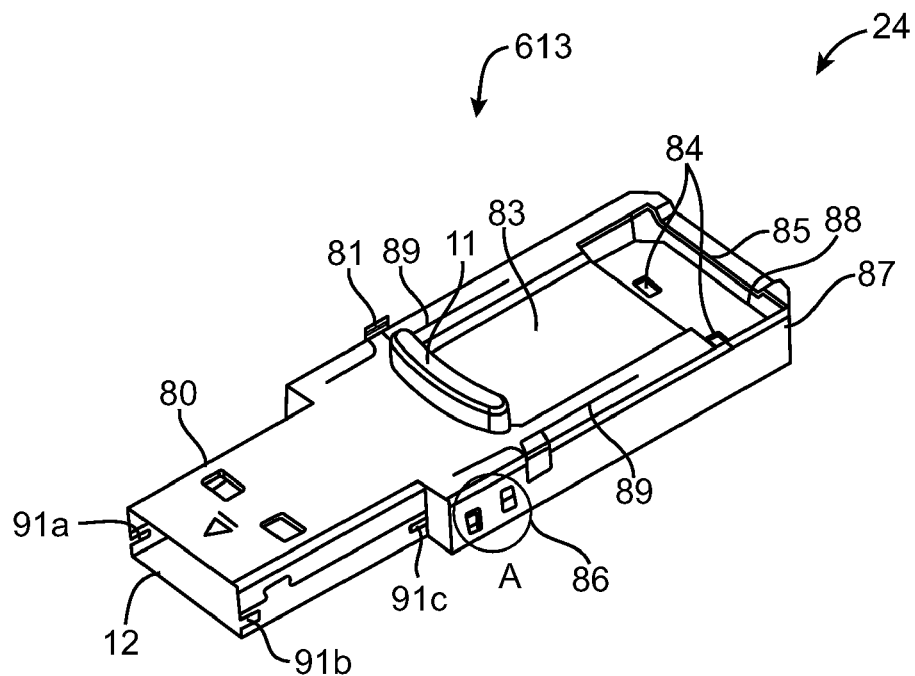
Figure 8:
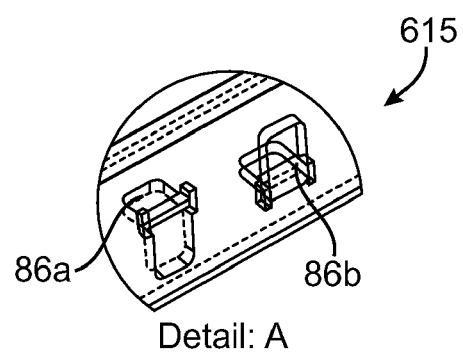

FIG. 8 shows a general view and a close up view of the metal PCBA slide-through . (or "slide-thru") support tabs 86a and 86b of metal case 24 of press/push flash drive 10 in an embodiment of the present invention.

Figure 9:
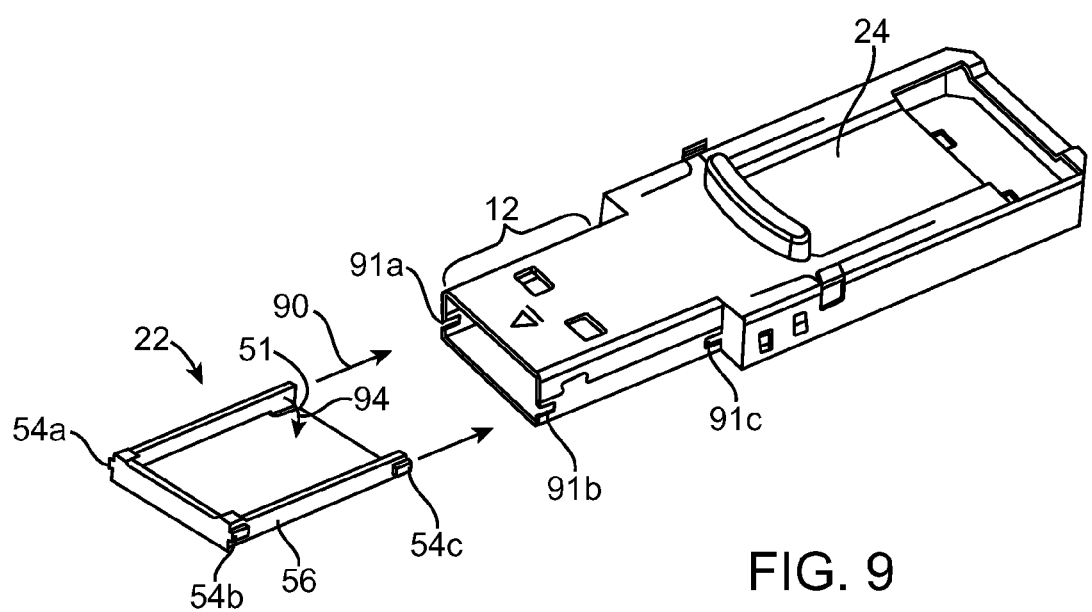
Figure 10:
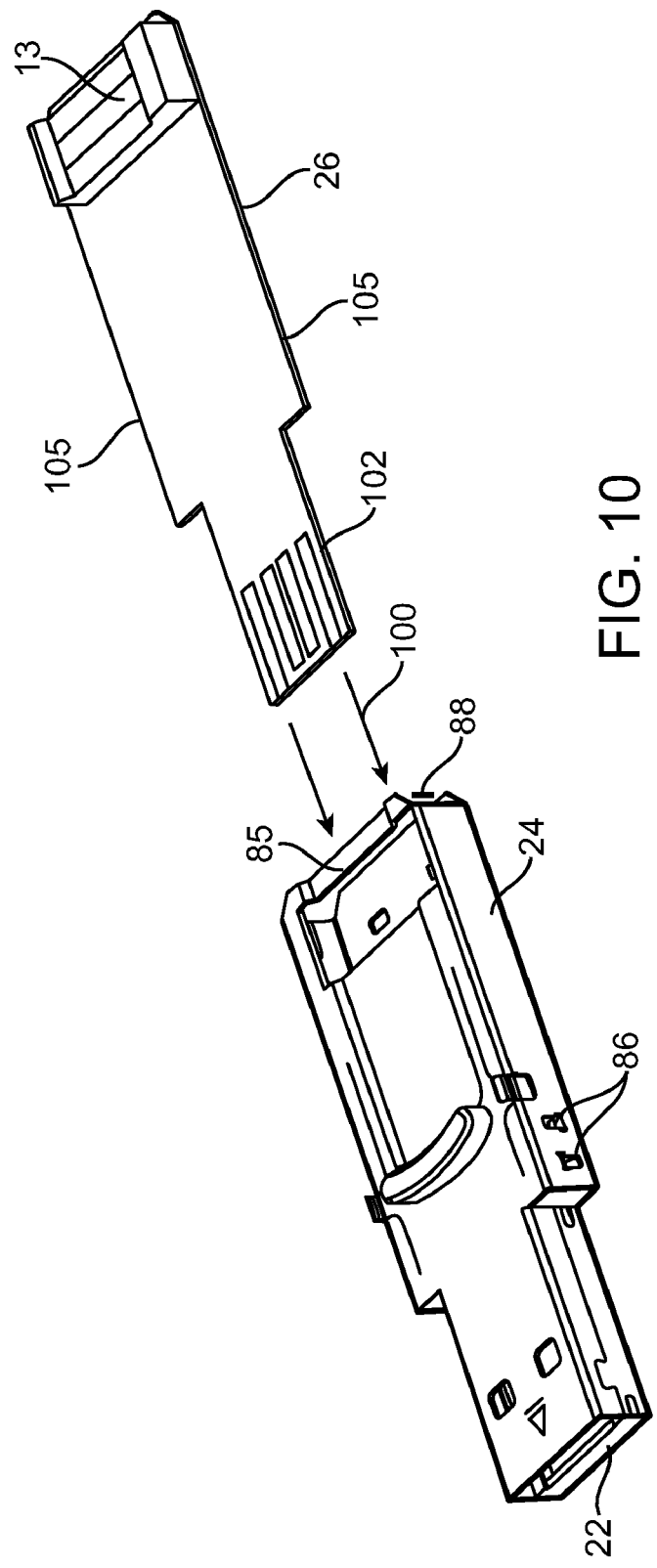
Figure 11:
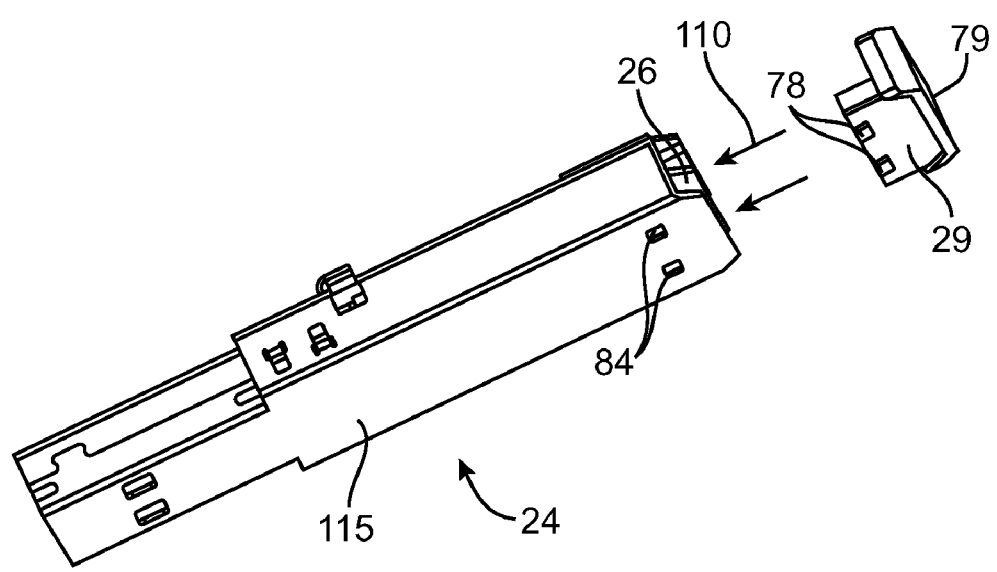

FIGS. 9-11 show the first three assembly steps of the internal components of press/push flash drive 10 in an embodiment of the present invention.

Figure 12:
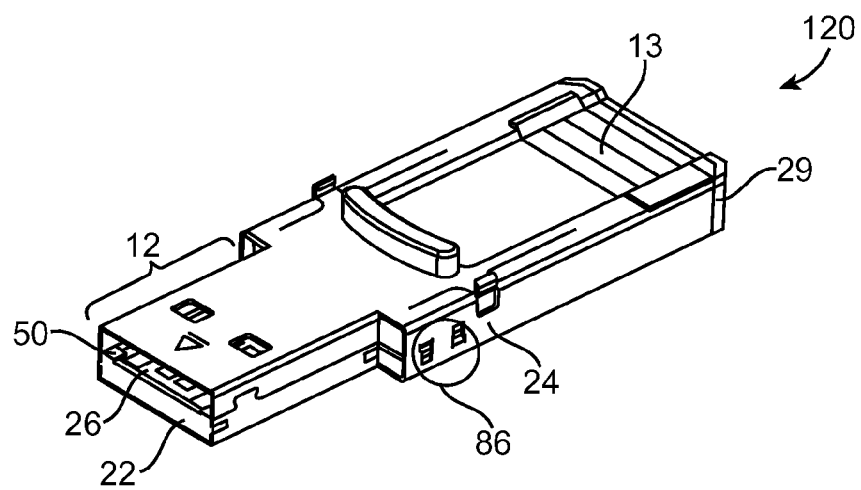

FIG. 12 shows the completed sub-assembly of press/push flash drive 10, also known as slim USB device 120, in an embodiment of the present invention.

Figure 13:
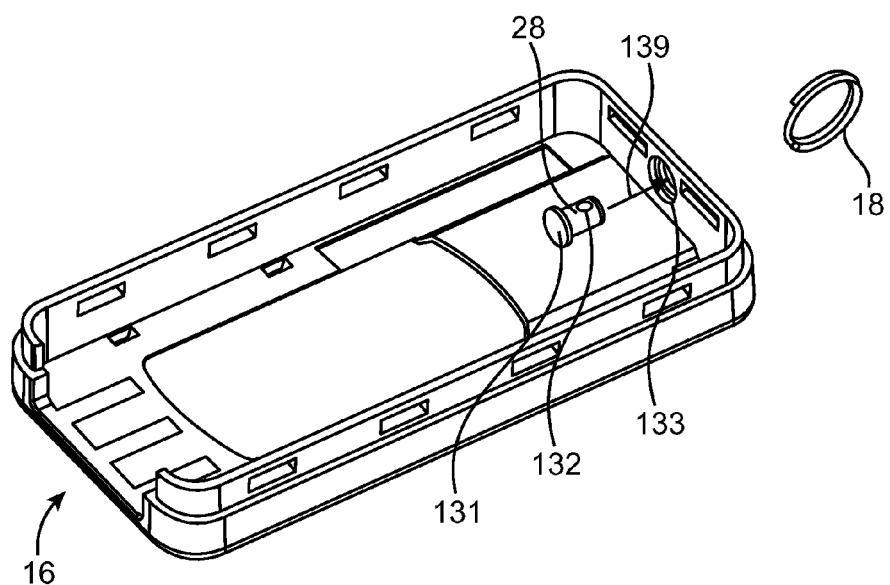
Figure 14:
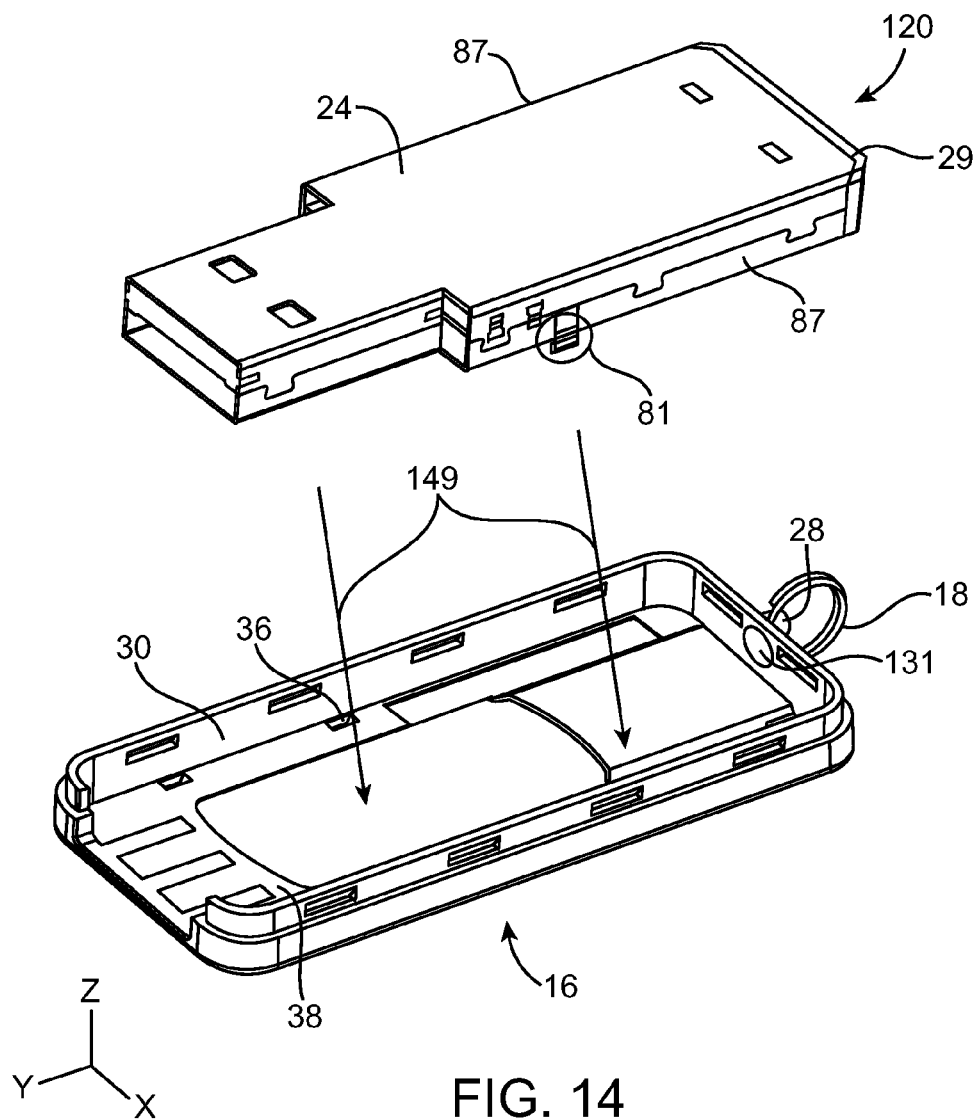
Figure 15:
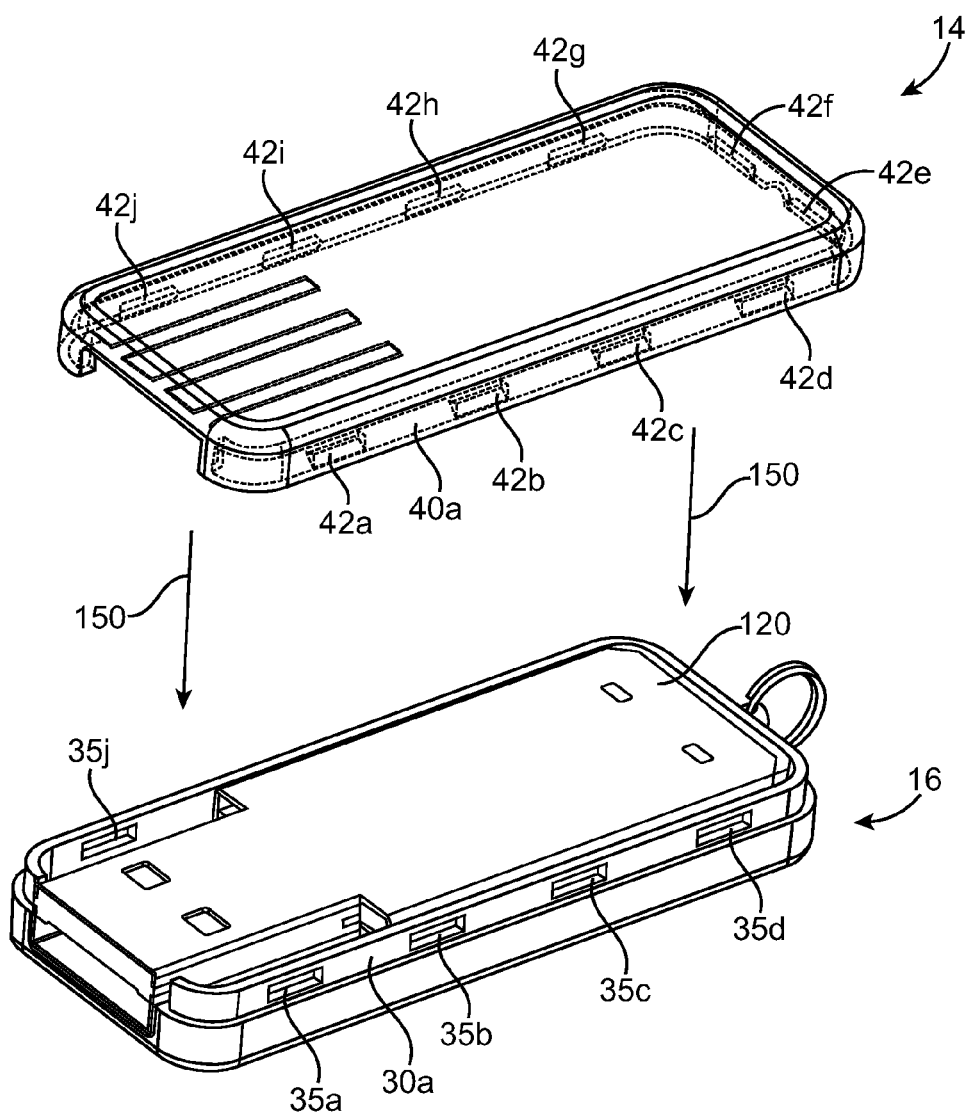

FIGS. 13-15 show final three assembly steps, steps 4-6, of press/push flash drive 10 in an embodiment of the present invention.

Figure 16:
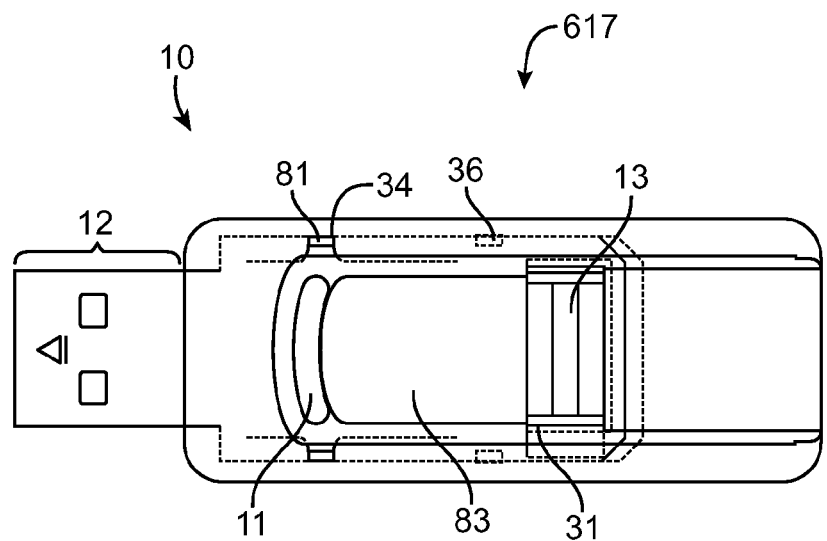
Figure 16:
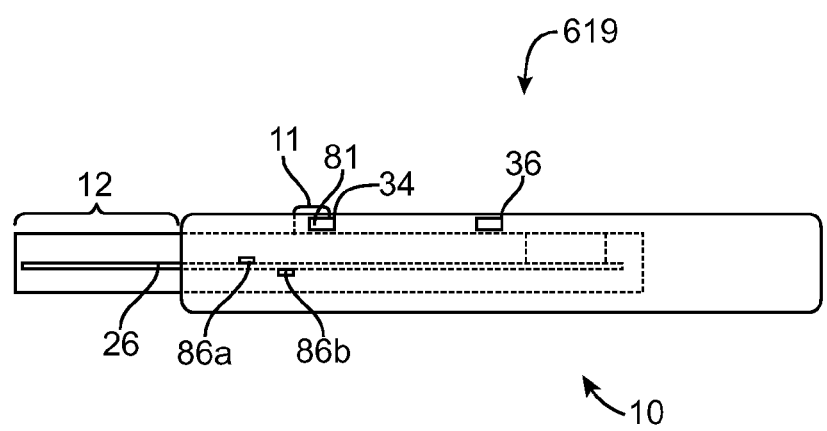

FIG. 16 shows a transparent outline view of press/push flash drive 10, with USB plug 12 in extended mode, in an embodiment of the present invention.

Figure 17:
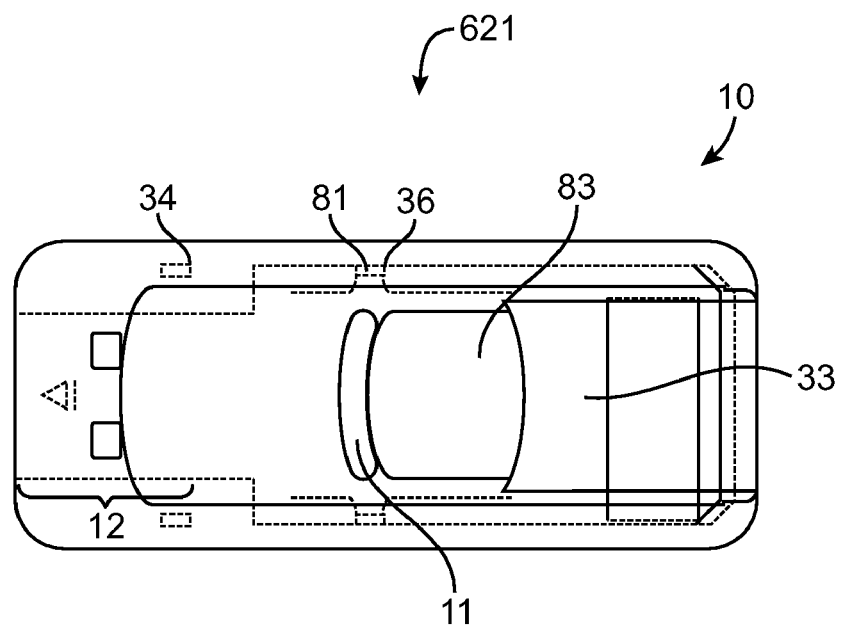
Figure 17:
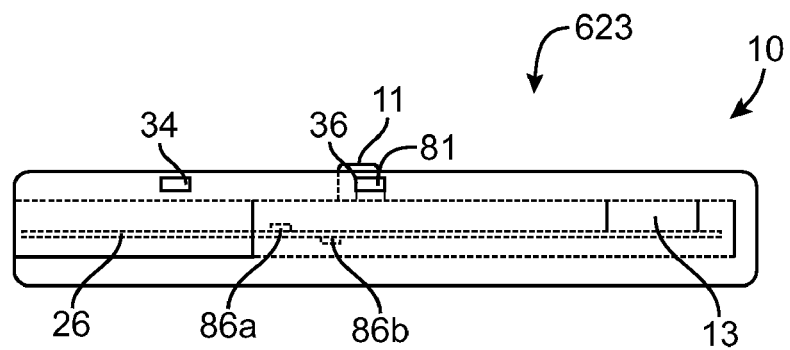

FIG. 17 shows a transparent outline view of press/push flash drive 10, with USB plug 12 in retracted mode, in an embodiment of the present invention.

Figure 18A:
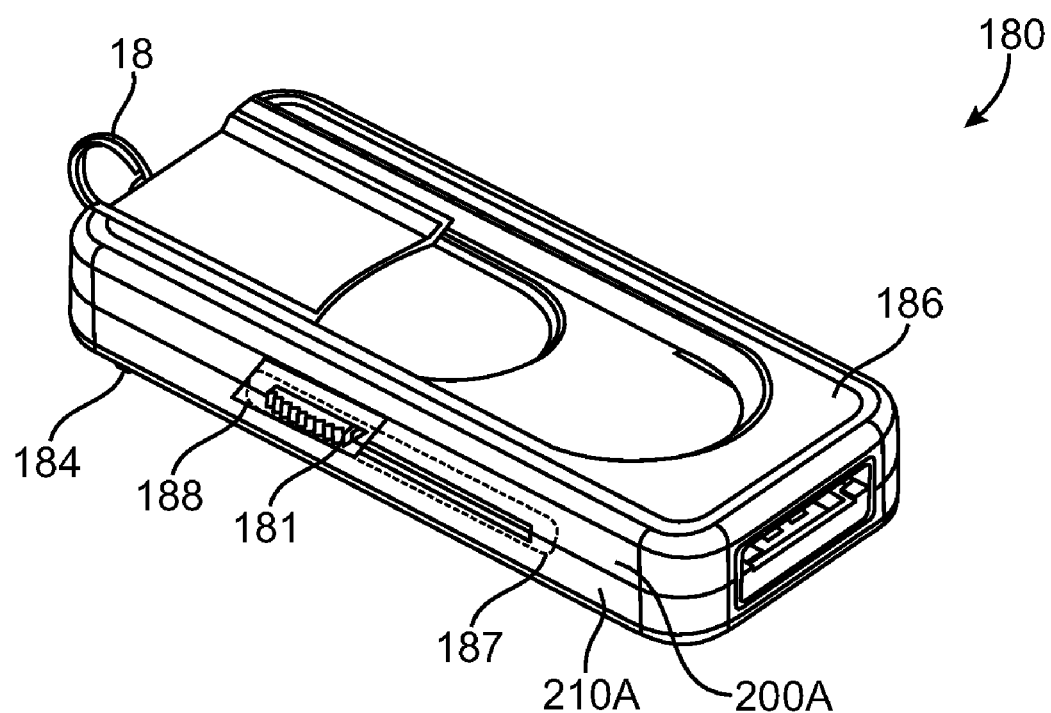

FIG. 18(a) shows a top angular view of side-switching press/push USB flash drive 180 with USB plug retracted, in an alternative embodiment of the present invention.

Figure 18B:
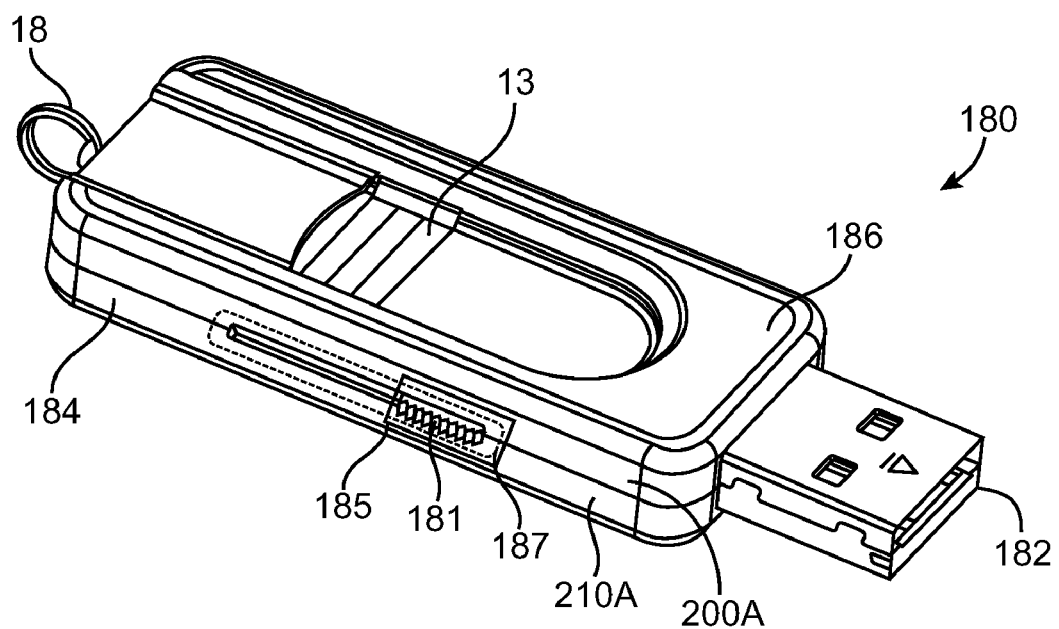

FIG. 18(b) shows a top angular view of side-switching press/push USB flash drive 180 with USB plug extended, in an embodiment of the present invention.

Figure 19:
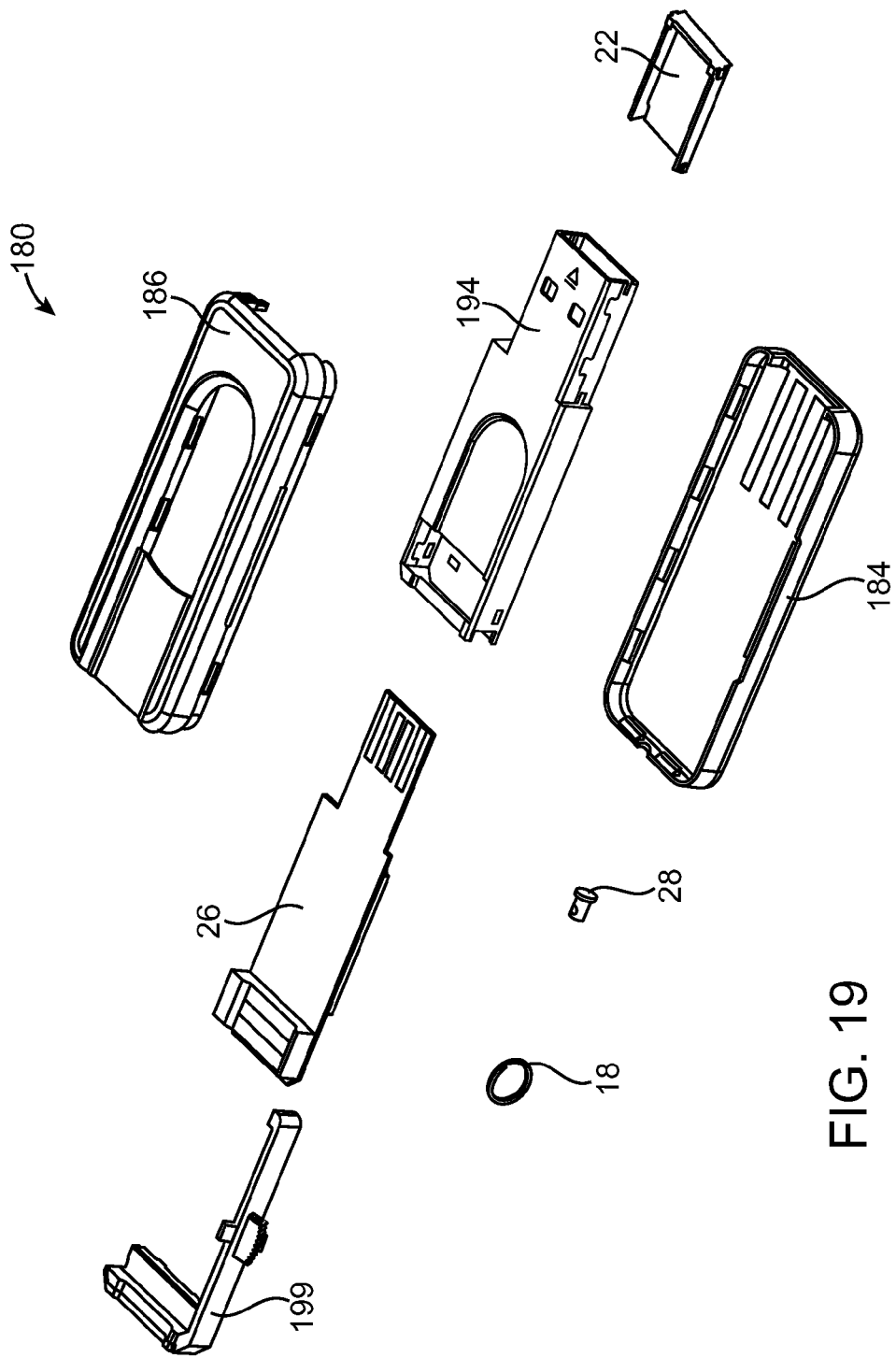

FIG. 19 shows an exploded view of side-switching press/push flash drive 180, in an embodiment of the present invention.

FIGS. 20(a) and 20(b) show an angular top and bottom view, respectively, of upper housing 186 of side-switching press/push flash drive 180, in an embodiment of the present invention.

Figure 21:
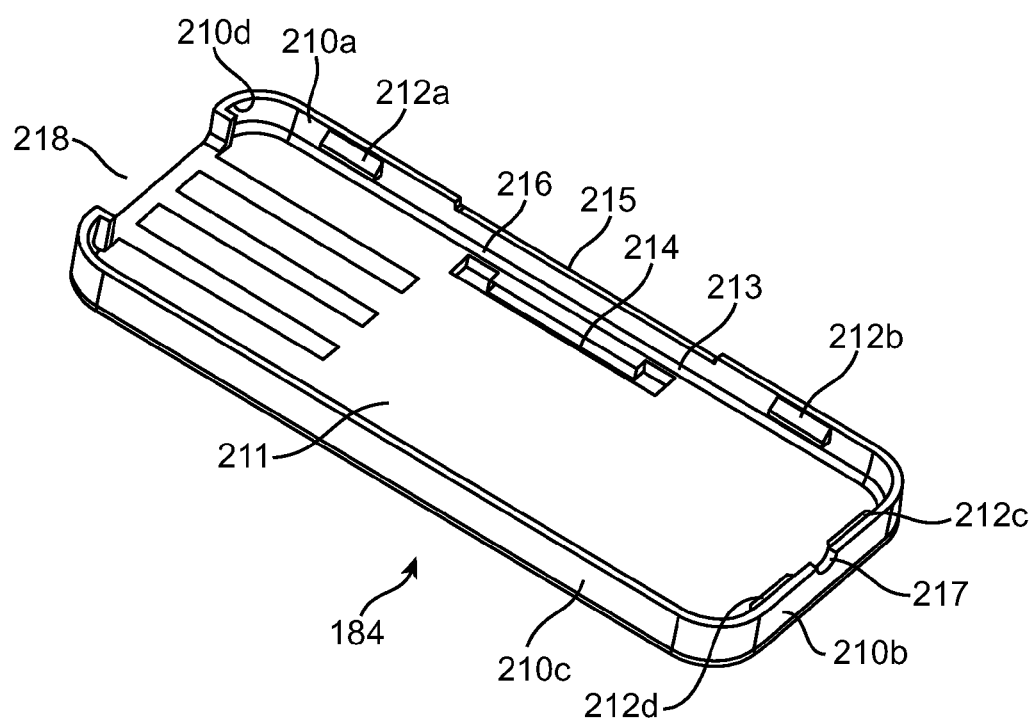

FIG. 21 shows an angular top view of lower housing 184 of side-switching press/push flash drive 180, in an embodiment of the present invention.

Figure 22B:
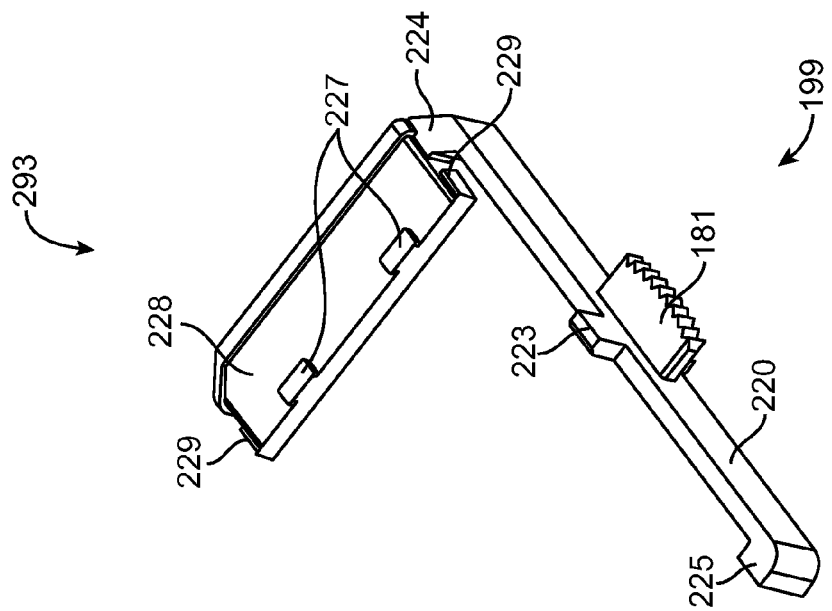
Figure 22A:
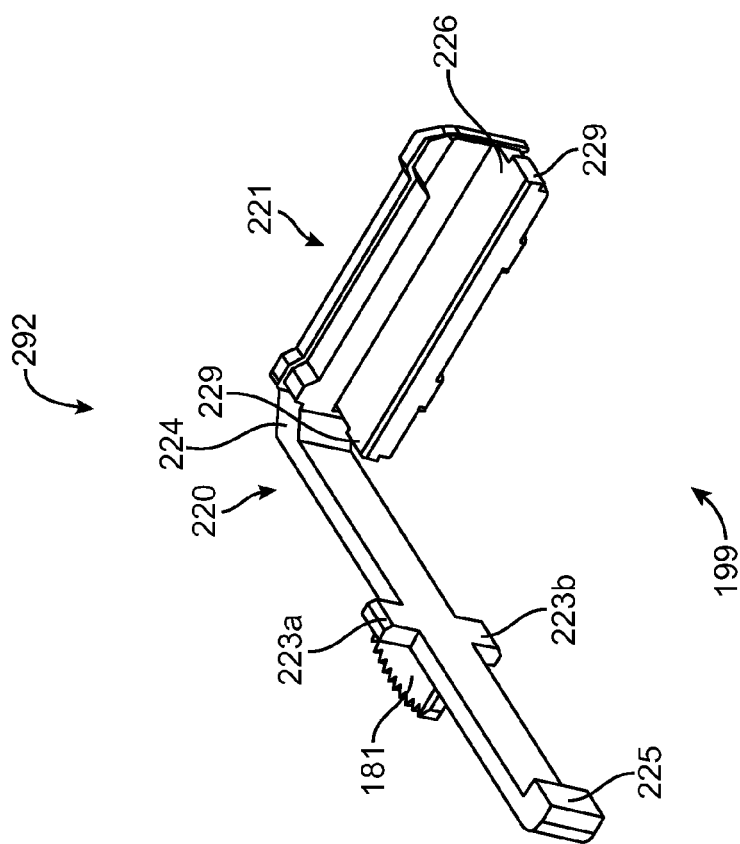

FIGS. 22(a) and 22(b) show an angular top and bottom view, respectively, of end cap 199 of side-switching press/push flash drive 180, in an embodiment of the present invention.

Figure 23:
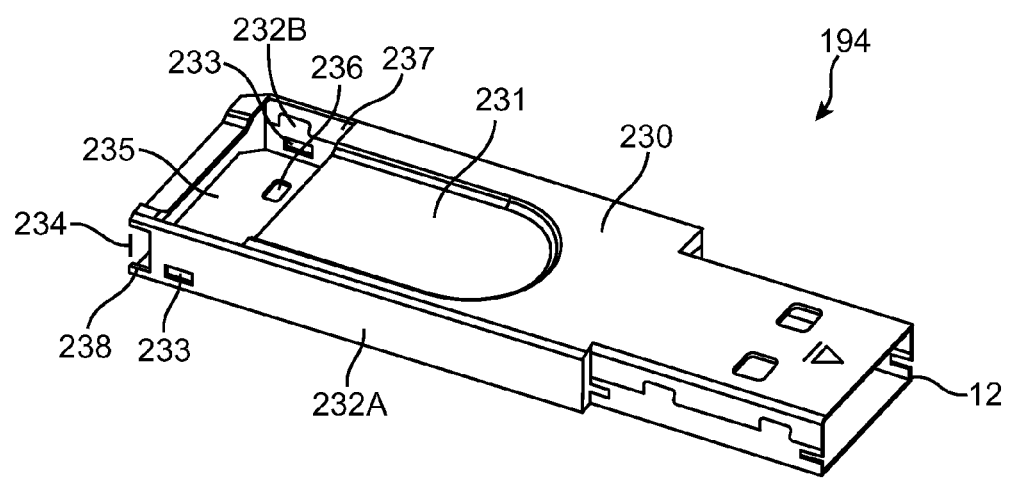

FIG. 23 shows an angular top view of metal case 184 of side-switching press/push flash drive 180, in an embodiment of the present invention.

Figure 24:
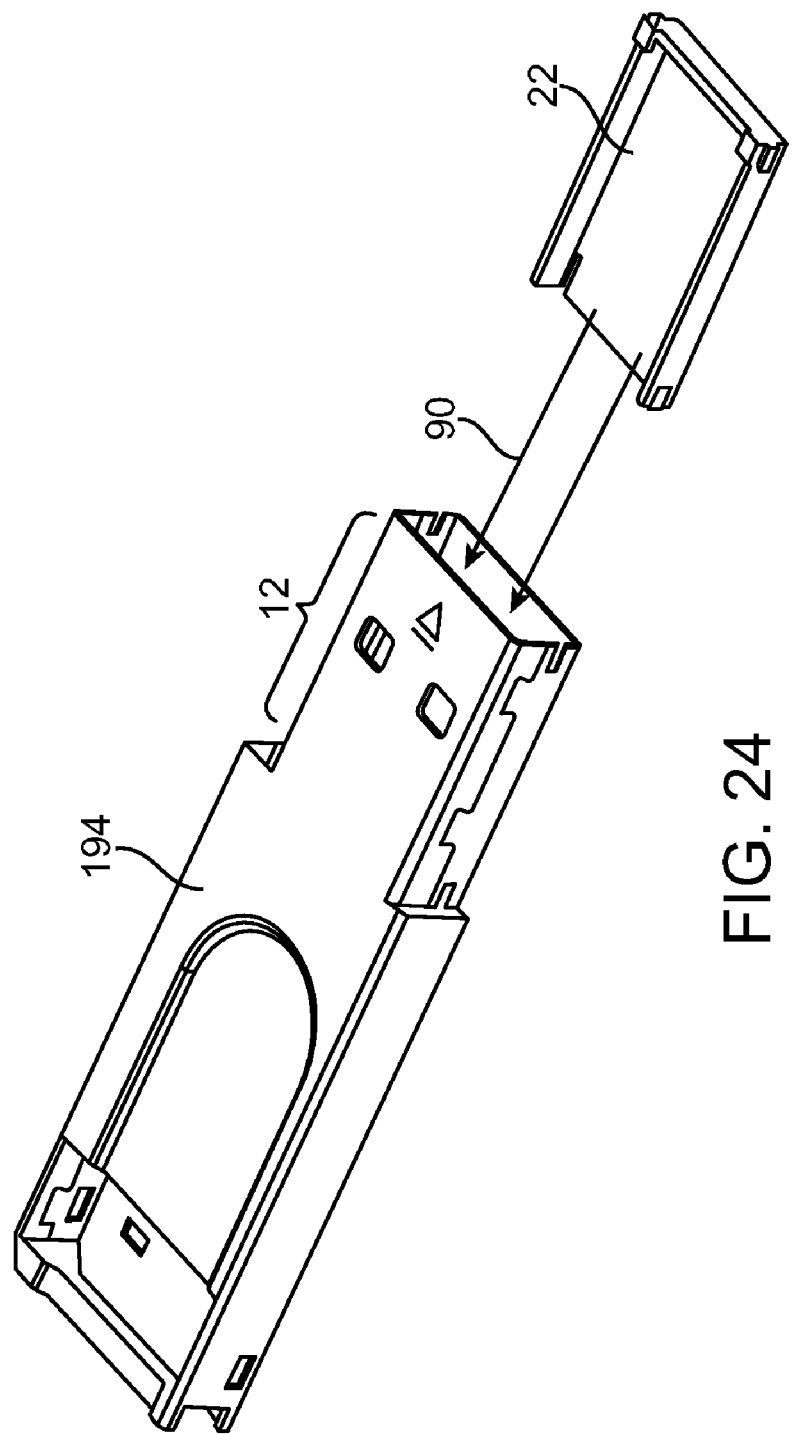
Figure 25:
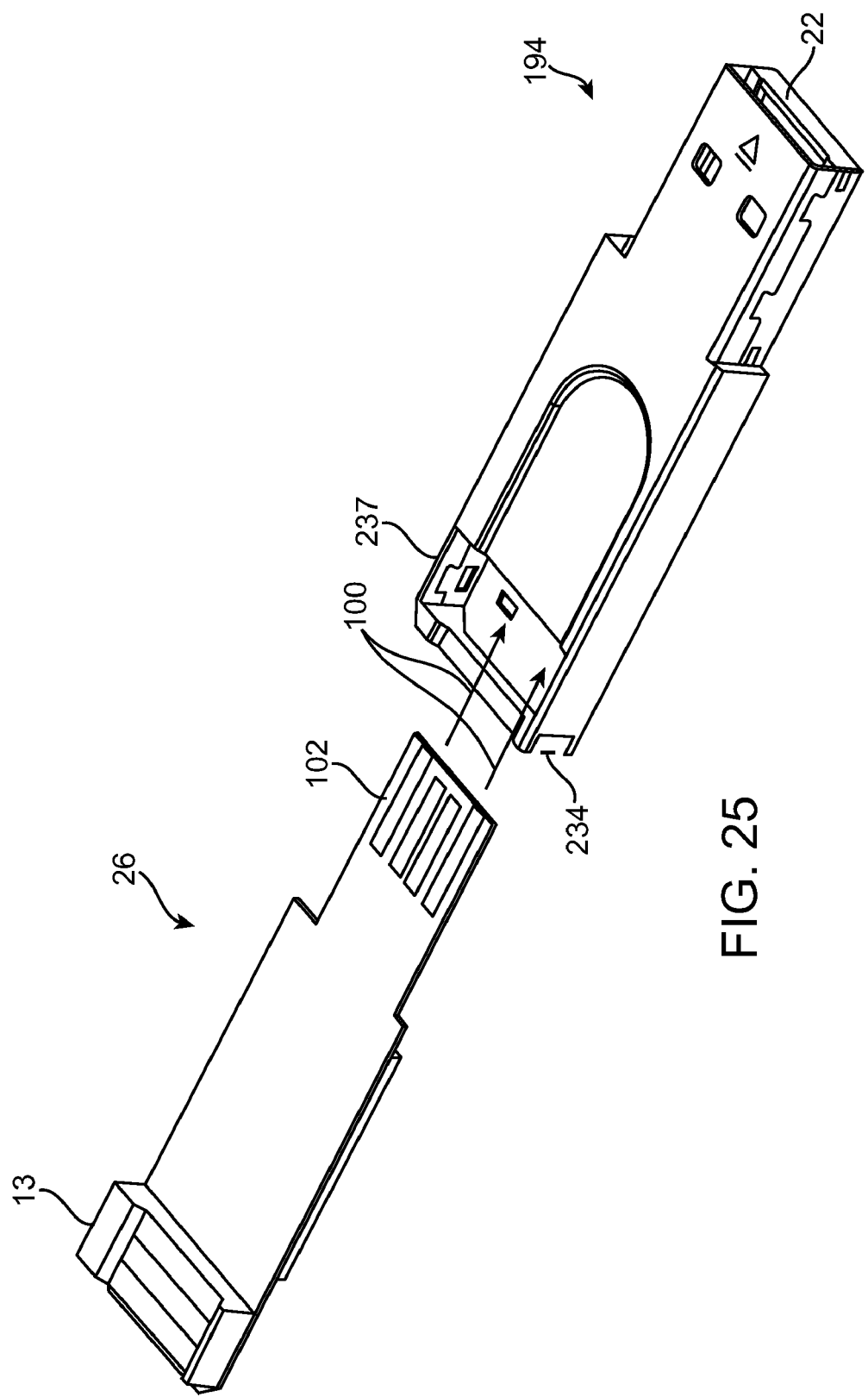
Figure 26:
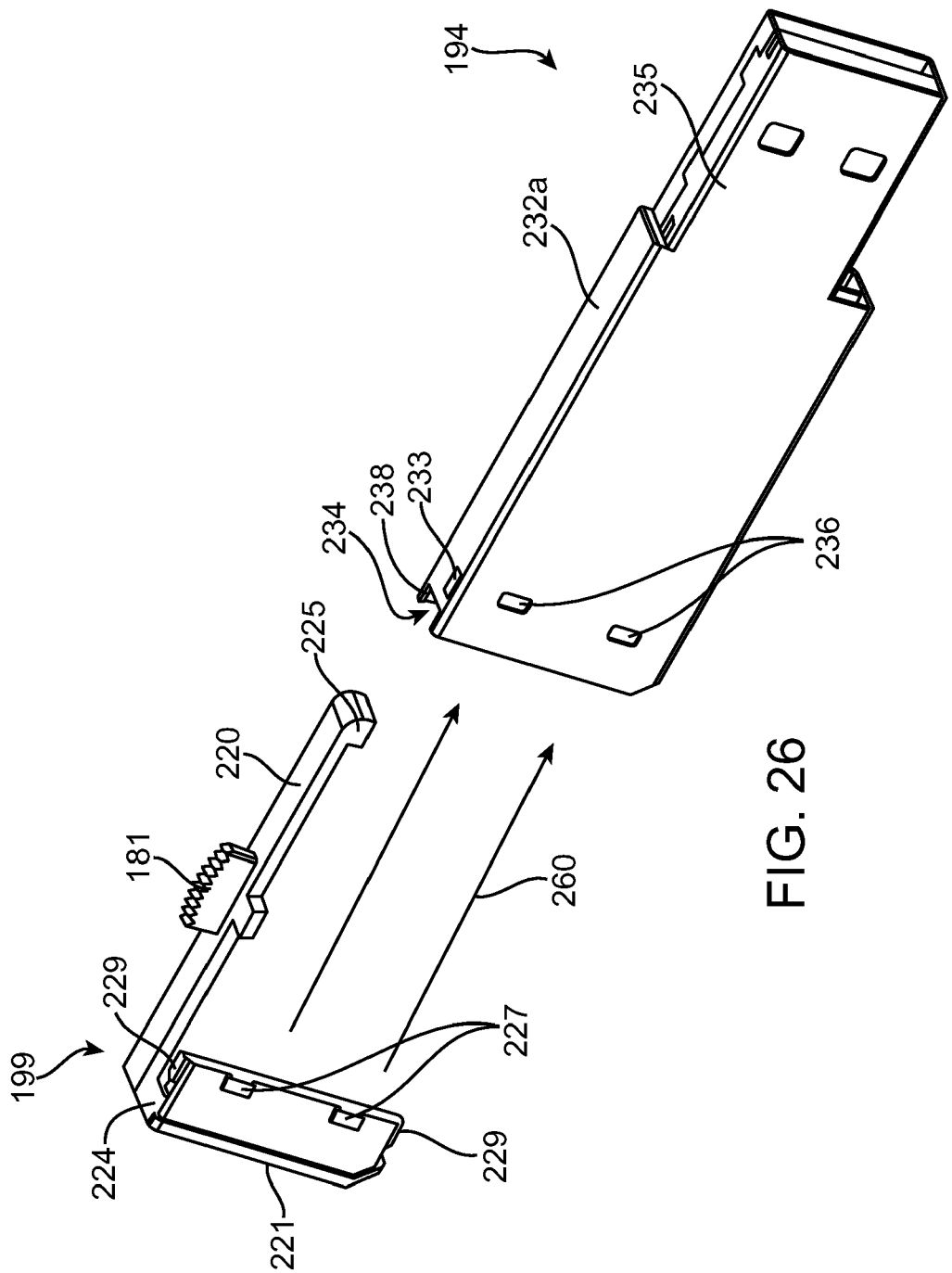

FIGS. 24-26 show the first three assembly steps of side-switching press/push flash drive 180, in an embodiment of the present invention.

Figure 27:
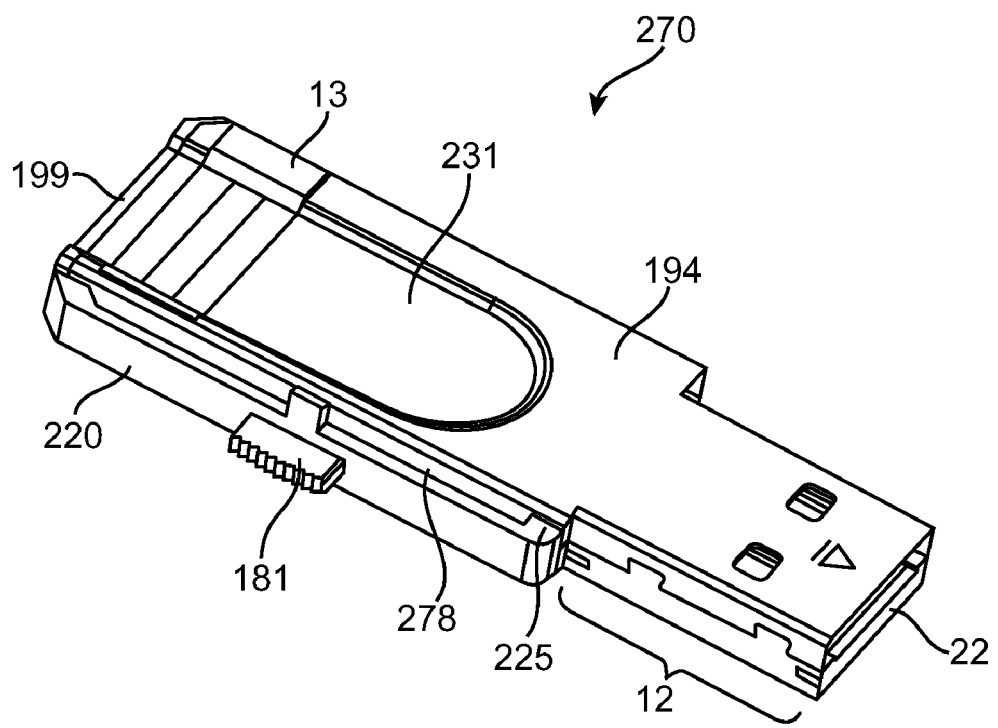

FIG. 27 shows the completed sub-assembly of side-switching press/push flash drive 180, also known as slim USB device 270, in an embodiment of the present invention.

Figure 28:
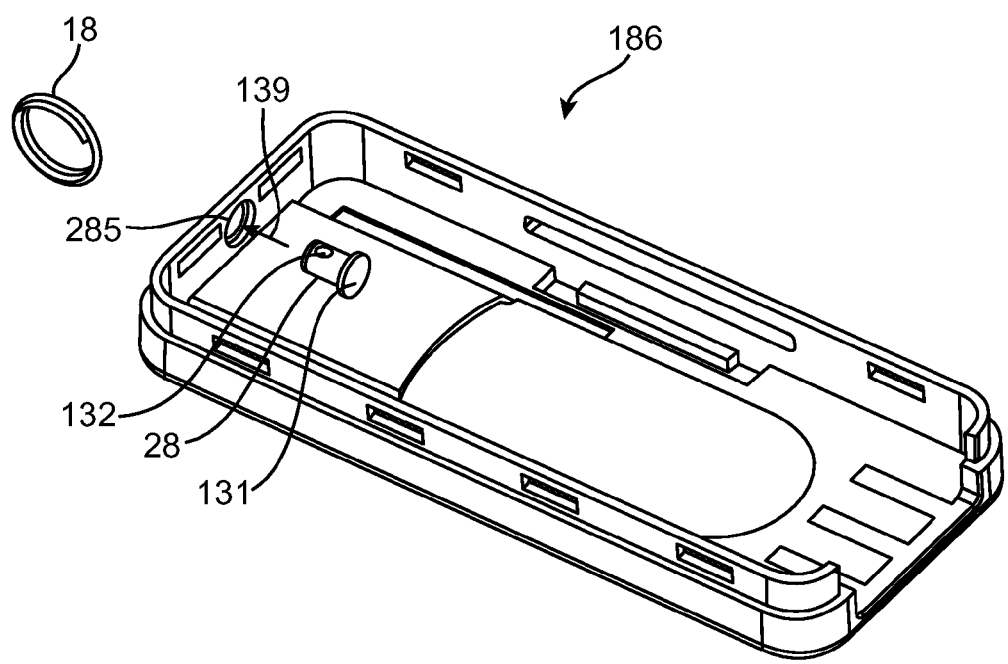
Figure 29:
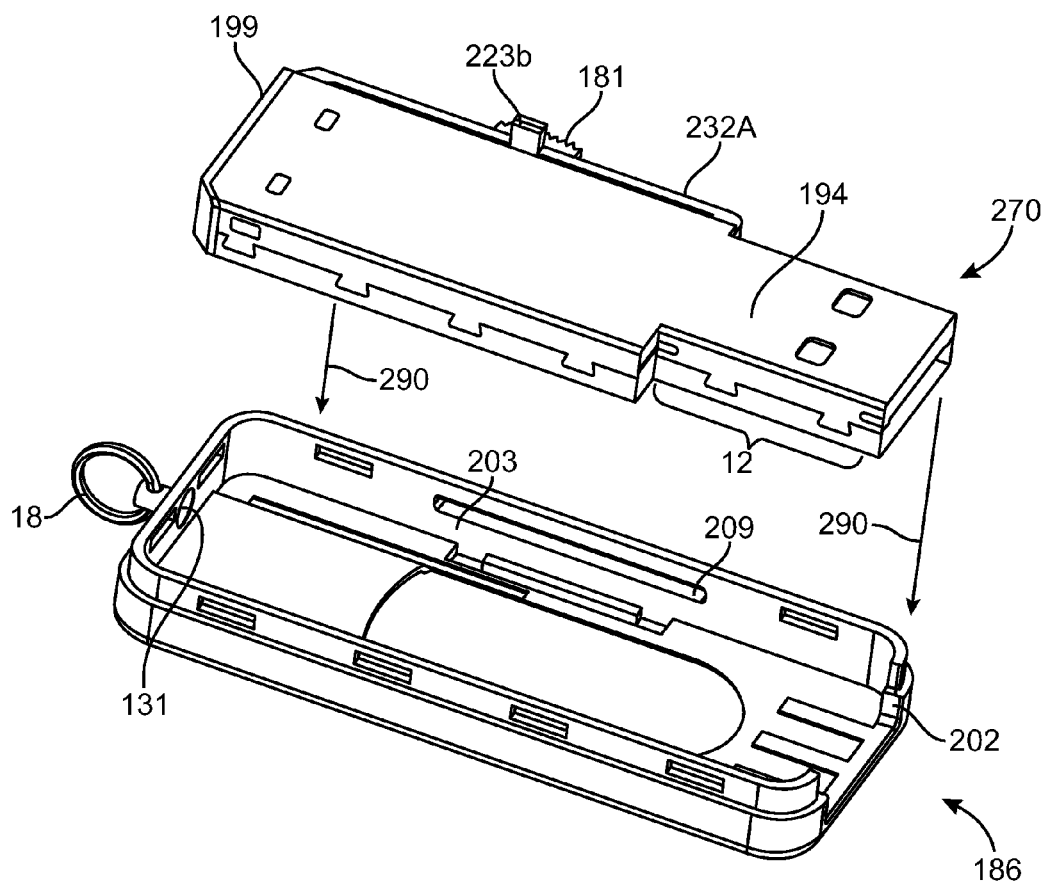
Figure 30:
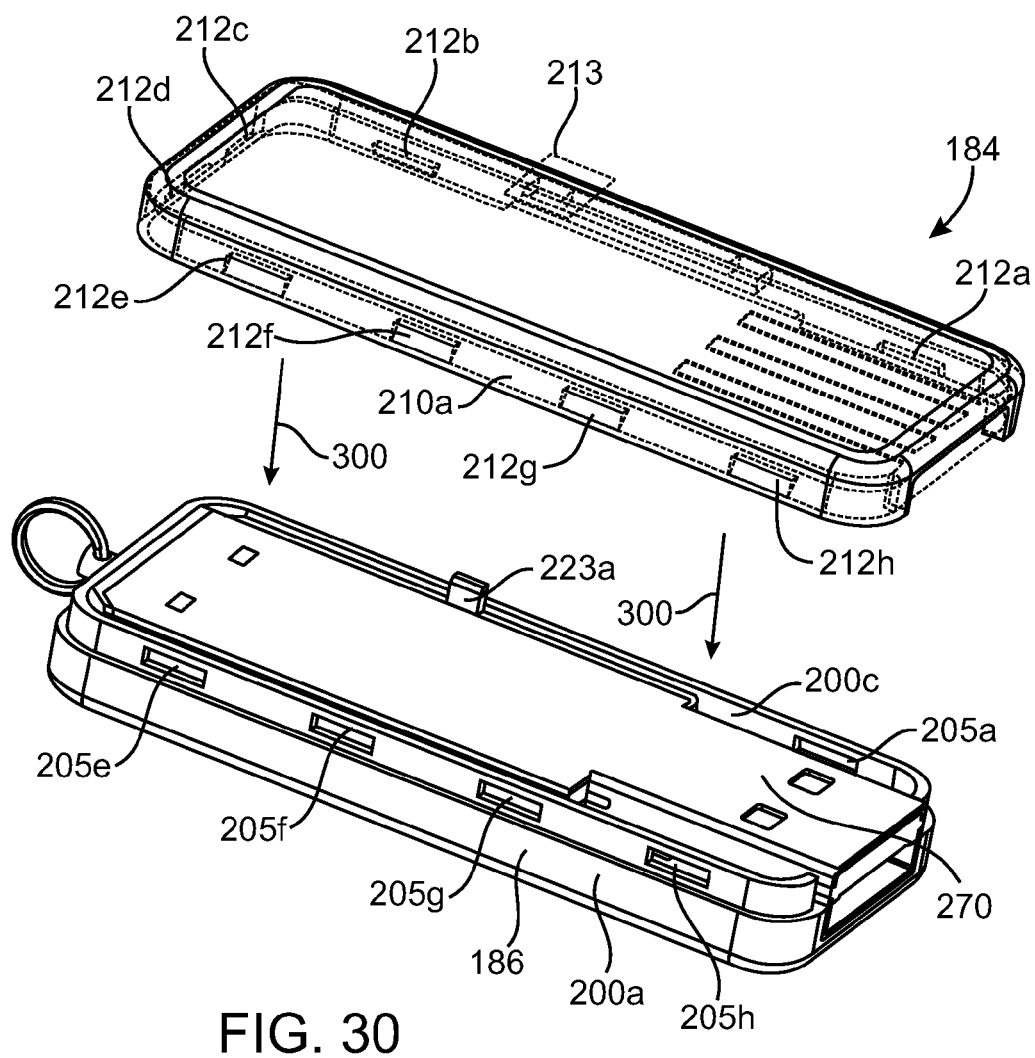

FIGS. 28-30 show the final three assembly steps of side-switching press/push flash drive 180, in an embodiment of the present invention.

Figure 31A:
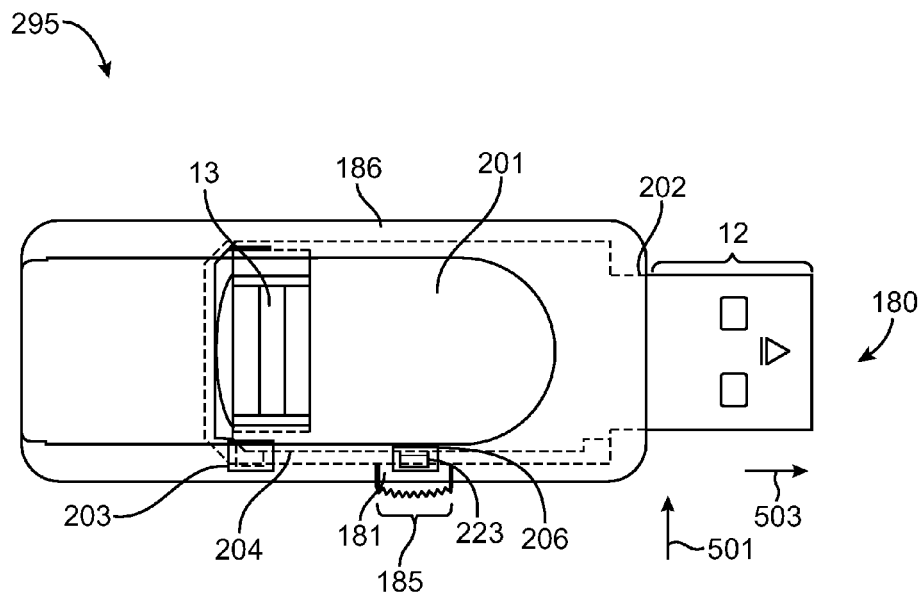
Figure 31B:
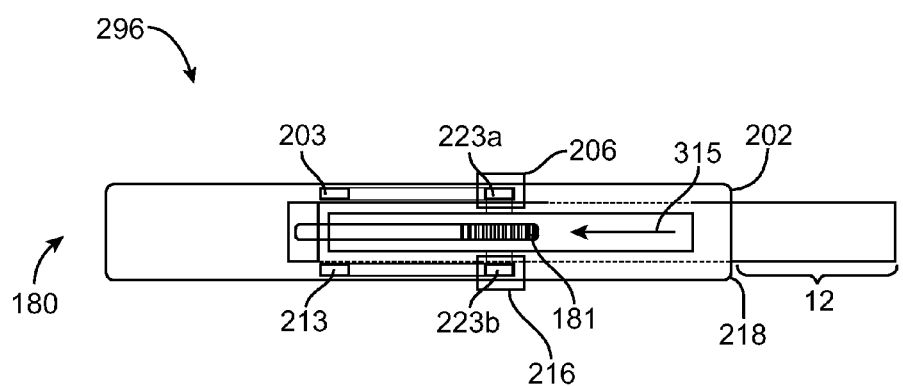

FIG. 31 shows a transparent outline top view and a transparent outline side view of side-switching press/push flash drive 180, with metal USB plug 12 extended, in an embodiment of the present invention.

Figure 32:
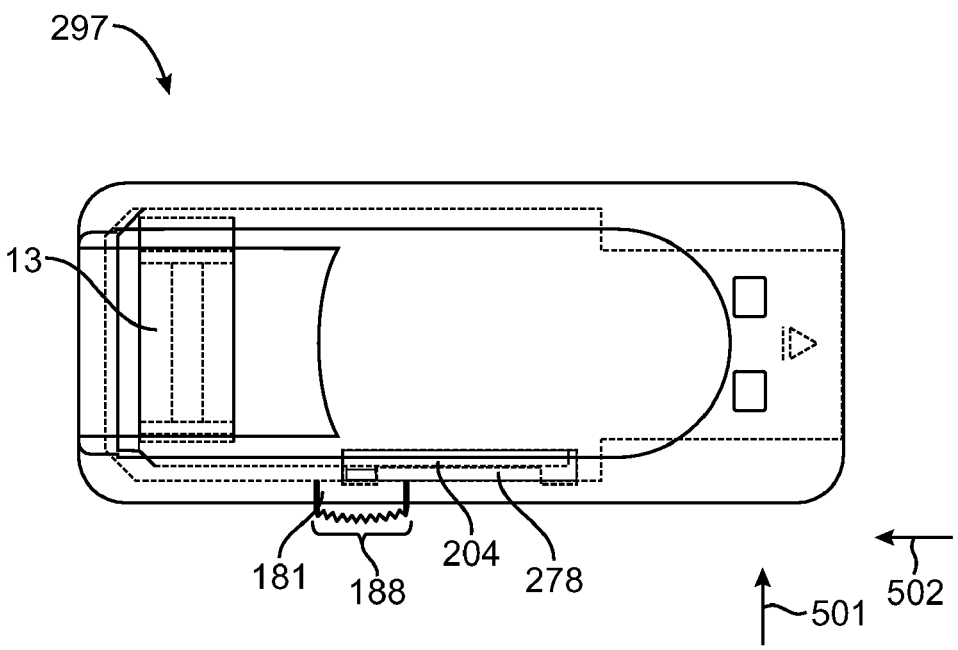
Figure 32:
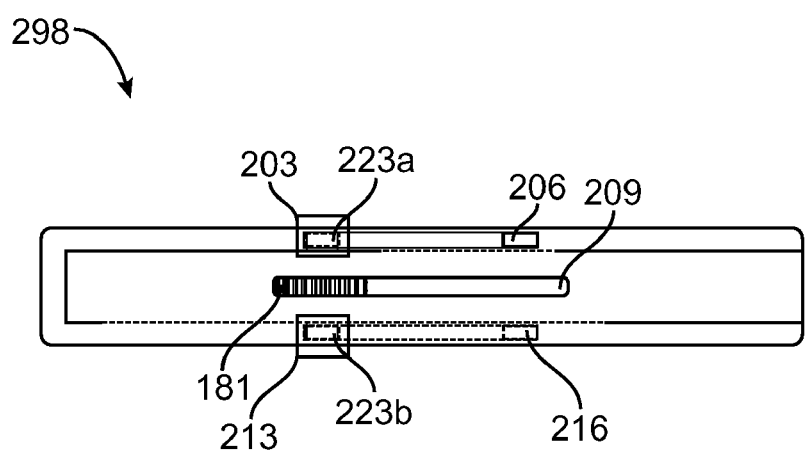

FIG. 32 shows a transparent outline top view and a transparent outline side view of side-switching press/push flash drive 180, with metal USB plug 12 retracted, in an embodiment of the present invention.

Figure 33:
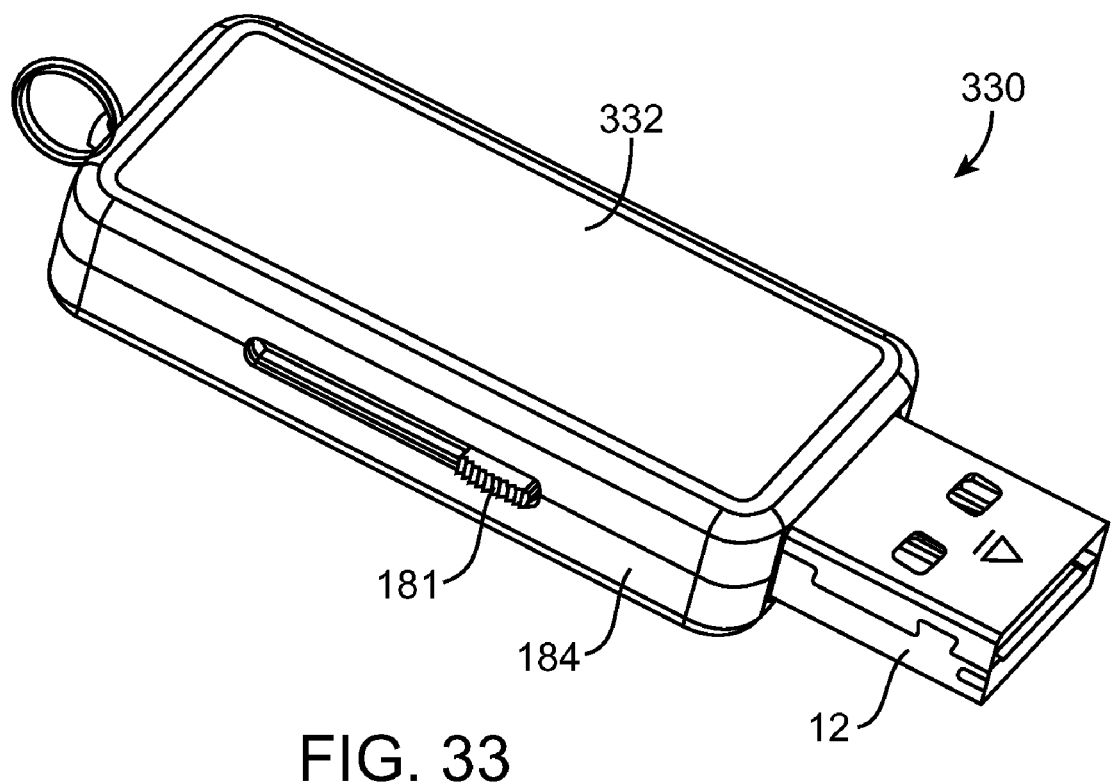
Figure 11:
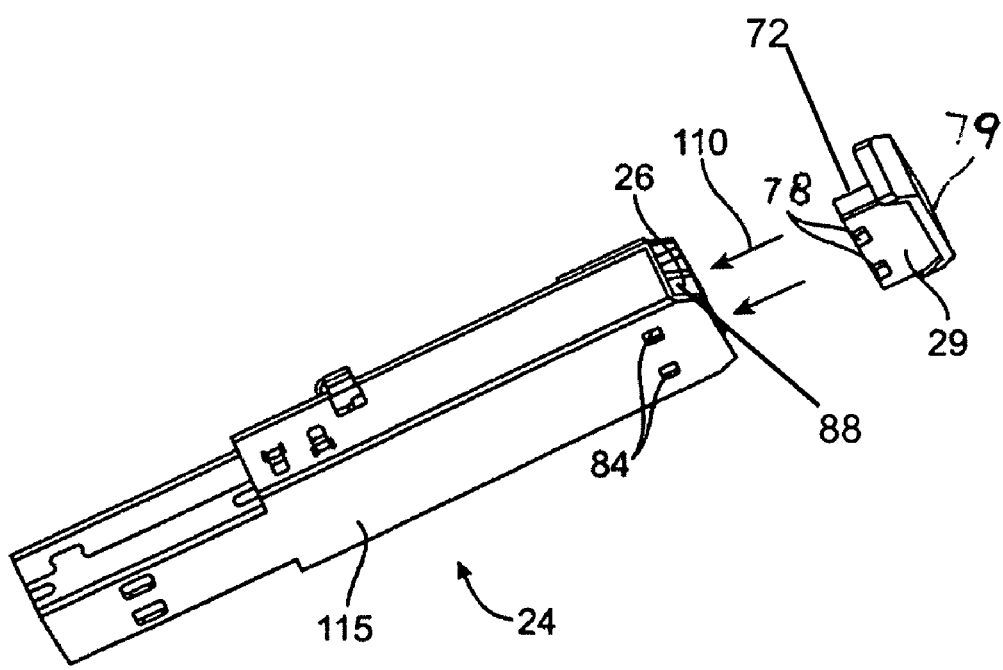

FIG. 33 shows a top angular view of side-switching press/push flash drive 330, with metal USB plug 12 extended, in another embodiment of the present invention.

DETAILED DESCRIPTION OF THE PREFERRED EMBODIMENT

In the following description of the embodiments, reference is made to the accompanying drawings that form a part hereof, and in which is shown by way of illustration of the specific embodiments in which the invention may be practiced. It is to be understood that other embodiments may be utilized because structural changes may be made without departing from the scope of the present invention. It should be noted that the figures discussed herein are not drawn to scale and thicknesses of lines are not indicative of actual sizes.

In an embodiment of the present invention, a mechanically simplified press/push flash drive is disclosed. The press/push flash drive is comprised of a subassembly containing the necessary electronic devices, support materials, and two outer pieces that are pressed together to form a protective housing. The external switch on the press/push flash drive can be toggled between two distinct positions. When the switch is located in the position furthest from where the metal USB plug extends out of the housing, the metal USB plug is retracted and hidden from view, as is an optional fingerprint sensor in one embodiment of the present invention. When the switch is toggled so that it is pushed in the direction most closely to where the USB plug extends out of the housing, the metal USB plug is extended and capable of being interfaced with another electronic device, such as a personal computer. Additionally, in one embodiment of the present invention, when the switch is in this second toggle position (metal USB plug extended), a fingerprint sensor is also accessible. A user can make use of the fingerprint sensor by swiping their finger over the sensor, in order to lock and secure, or unlock and grant access to, the information contained within the memory of press/push flash drive. The switch mechanism of press/push flash drive 10 operates in a simple linear path, and relies upon the flexible and resilient properties of plastic to secure the drive in both the extended and retracted positions, and utilizes minimal materials to ensure a compact size of the final package.

The 'press and push' flash drive of the various embodiments of the present invention is generally rectangular shaped, although other usable shapes are anticipated. The flash drive may or may not include fingerprint verification capability. With the fingerprint verification capability, sensitive data stored in the USB flash drive is protected by allowing access only after the fingerprint sensor recognizes the fingerprint of the user. This is advantageous with respect to the security of the device, as well as the protection of individual rights.

Another alternative of the invention is to have the press/push button on the side of the package instead of the top as primary design. This alternative also has the option to include the fingerprint verification capability.

The concept for deploying the USB connector is for the user to press down and push forward the button. To retract the USB connector, the user simply presses the button down and pushes it backward simultaneously. When equipped with the fingerprint verification capability, the fingerprint sensor area is completely exposed when the USB connector is deployed, facilitating the complete scanning of the user's fingerprint for verification. When the USB connector is fully retracted, the fingerprint sensor area is completely hidden within the device. The design of the 'press and push' flash drive, in accordance with the various embodiments of the present invention, locks the USB connector into either the fully deployed or fully retracted position.

Figure 1A:
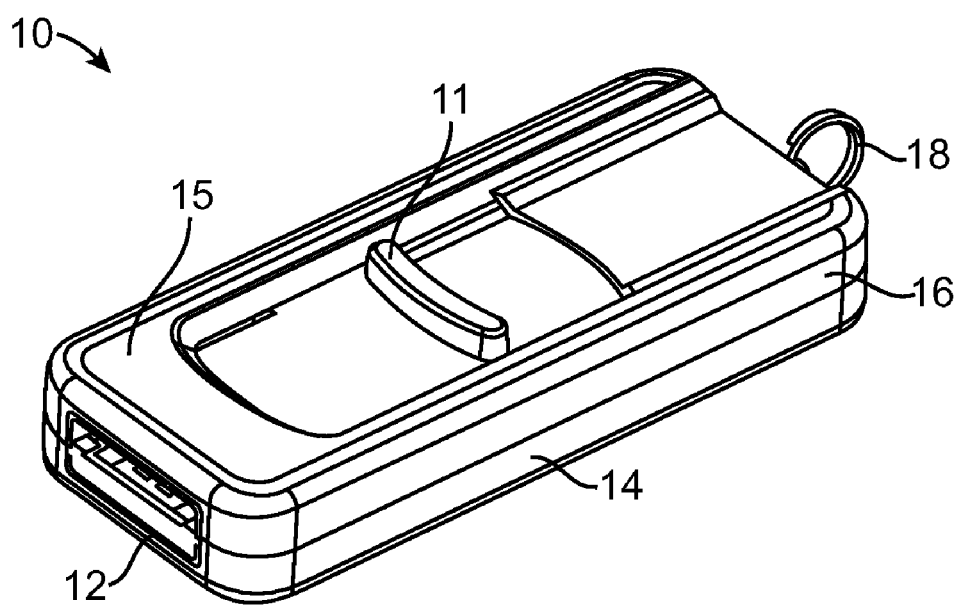
FIG. 1(a) shows a top angular view of press/push flash drive 10 in an embodiment of the present invention, with USB plug retracted.

Referring now to FIG. 1(a), a top angular view of the press/push flash drive 10 is shown in accordance with an embodiment of the present invention. The press/push flash drive 10 is comprised of a metal USB plug 12, a press/push button 11, a lower housing 14, an upper housing 16, and a key ring 18.

In FIG. 1(a), the press/push flash drive 10 is shown with a metal USB plug 12 retracted inside of the upper housing 16 and lower housing 14. Located substantially central to the external face 15 of the upper housing 16 is the press/push button 11. Press/push button 11 operates within the plane of external face 15, and when force is applied down into press/push flash drive 10 and in the direction away from the metal USB plug 12 using, for example, a finger, press/push button 11 slides uniaxially along the external face 15, retracting the metal USB plug 12, in one embodiment of the present invention. A key ring 18 is attached to the end opposite the metal USB plug 12, allowing the press/push flash drive 10 to be attached to, for example, a key chain.

When in the retracted position, the metal USB plug 12 is protected from environmental damage by the upper housing 16 and the lower housing 14.

Figure 1B:
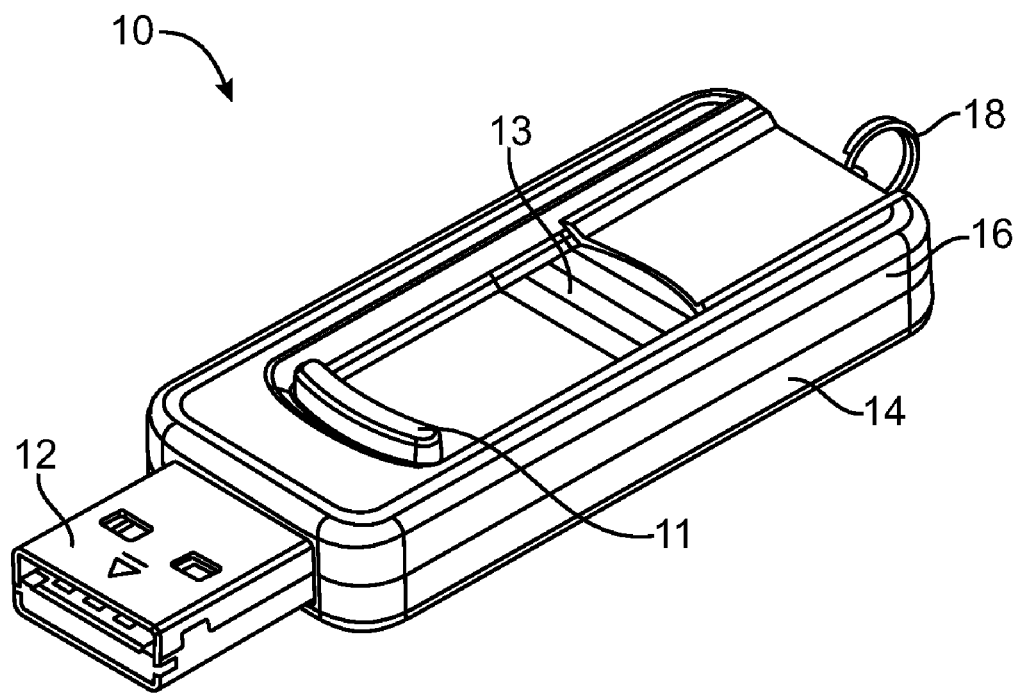
FIG. 1(b) shows a bottom angular view of press/push flash drive 10 in an embodiment of the present invention, with USB plug extended.

Referring now to FIG. 1(b), a top angular view of the press/push flash drive 10 is shown in accordance with an embodiment of the present invention. The press/push flash drive 10 is comprised of a metal USB plug 12, a press/push button 11, a lower housing 14, an upper housing 16, a fingerprint sensor 13, and a key ring 18.

In FIG. 1(b), the press/push flash drive 10 is shown with the metal USB plug 12 exposed. Located substantially central to the external face 15 of the upper housing 16 is the press/push switch 11. Press/push button 11 operates within the plane of external face 15, and when force is applied down into the press/push flash drive 10 and in the direction toward the metal USB plug 12 using, for example, a finger, press/push button 11 slides uniaxially along the external face 15, extending the metal USB plug 12, in one embodiment of the present invention. In this position, the fingerprint sensor 13 is exposed for operation. Key ring 18 is located external to lower housing 14 and upper housing 16, and provides a method of securing press/push flash drive 10 to personal effects, such as a keyring or lanyard.

As shown in FIG. 1(b), upon the extension of metal USB plug 12, finger print sensor 13 is exposed simultaneously with metal USB plug 12. When metal USB plug 12 is extended, press/push flash drive 10 can be plugged into the USB port of an electronic device, such as, by example, a personal computer. Through the use of fingerprint sensor 13, the user can limit or grant access to the information contained within the memory of press/push flash drive 10.

Figure 2:
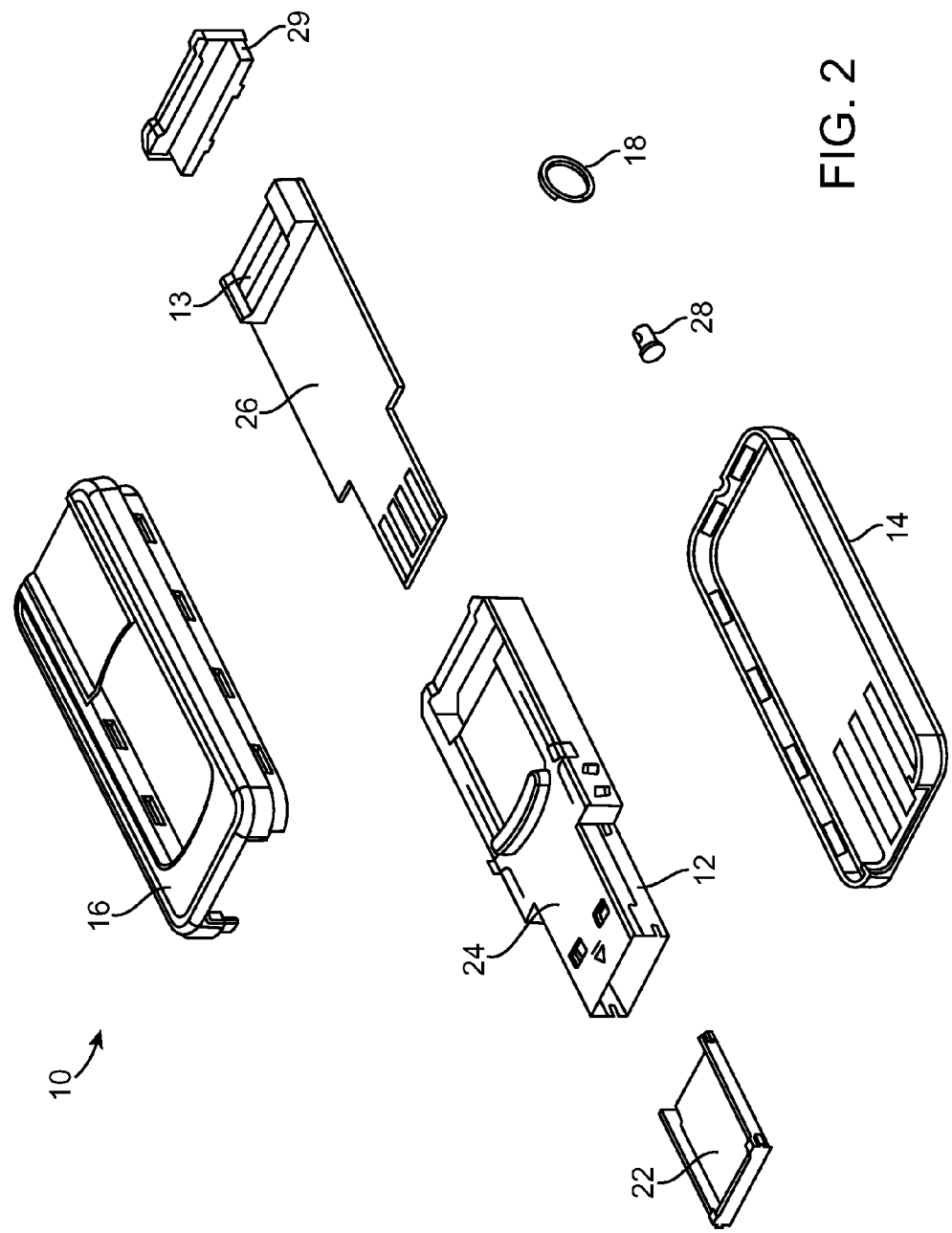
FIG. 2 shows an exploded view of the individual components of press/push flash drive 10 in an embodiment of the present invention.

Referring now to FIG. 2, an exploded view of press/push flash drive 10 is shown, in accordance with an embodiment of the present invention. The exploded view is shown to include a metal case 24, a PCB support 22, a lower housing 14, an upper housing 16, a printed circuit board assembly (PCBA) 26, an end cap 29, a pin 28, and a key ring 18. Detailed descriptions of these components and their interrelationships follows.

Figure 3:
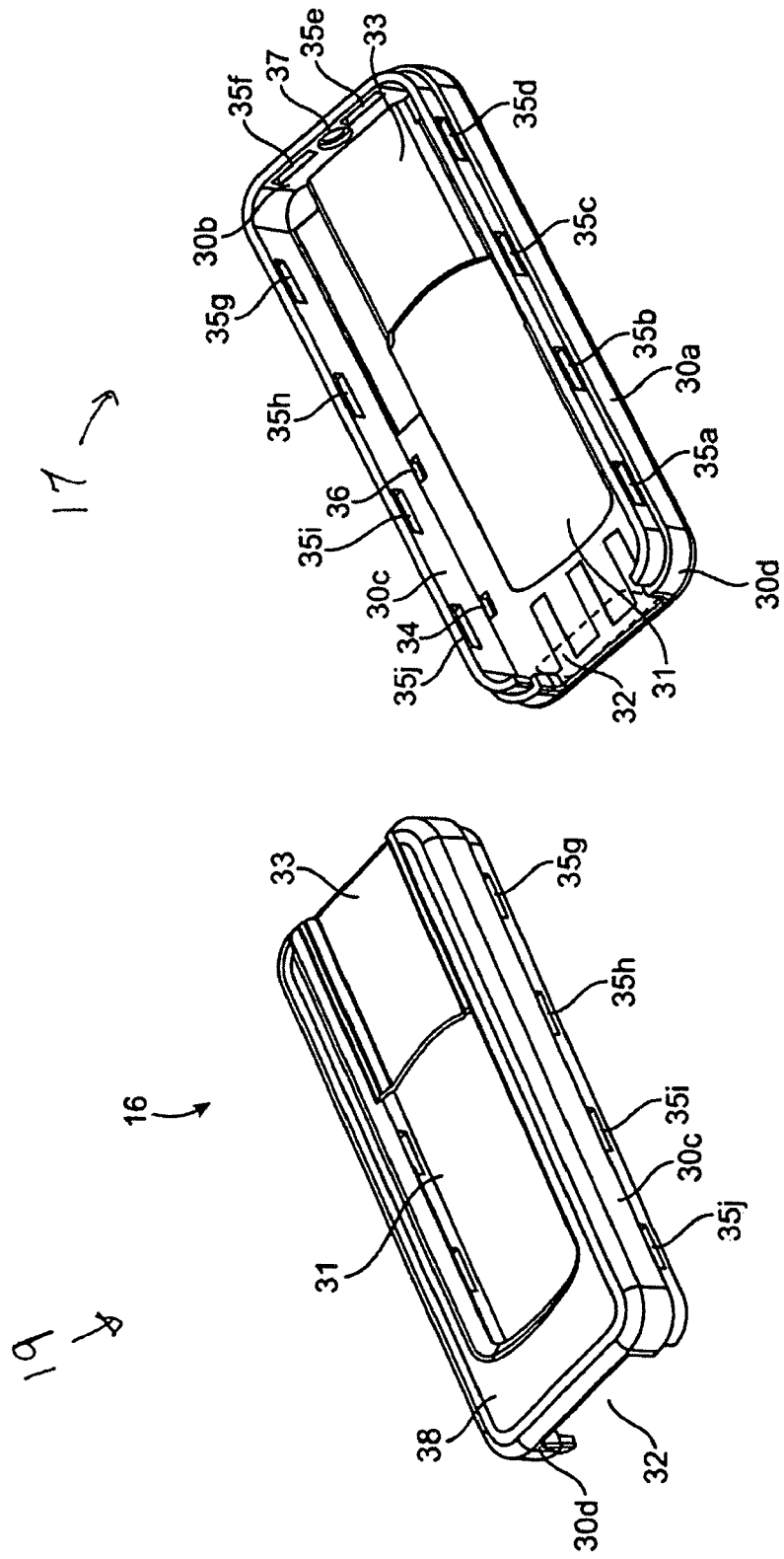

FIG. 3 shows a top angular view 19 of the upper housing 16 and a bottom angular view 17 of the upper housing 16 in accordance with an embodiment of the present invention. The upper housing 16 is shown to include four lateral sides 30 (30a-30d), a fingerprint cutout area 31, a front opening 32, a fingerprint cover area 33, two deployed lock grooves 34, a plurality of snap coupling slots 35 (35a-35j), two retracted lock grooves 36, a hole 37, and a rectangular face 38. The upper housing 16 is comprised substantially of an elastic and durable material, such as injection molded plastic.

In top angular view 19, the upper housing 16 is shown to be shaped generally as a rectangular box with a generally rectangular shaped front opening 32 on one end. On the rectangular face 38 of upper housing 16 is a fingerprint cutout area 31, which is located adjacent to a fingerprint cover area 33. Fingerprint cutout area 31 is a cutout region of the rectangular face 38, whereas fingerprint cover area 33 is a region of rectangular face 38 that is generally rectangular in shape. These areas (fingerprint cutout area 31 and fingerprint cover area 33) together comprise a substantial portion of the rectangular face 38. Protruding downward relative to the rectangular face 38 are lateral sides 30, which give the upper housing 16 an overall concave geometry.

In the bottom angular view 17, the lateral sides 30 protrude from the rectangular face 38 of upper housing 16, creating a lip along the outer perimeter of the rectangular shape. Lateral sides 30 are further subdivided into lateral sides 30a, 30b, 30c and 30d to assist in describing the alignment of upper housing 16 with lower housing 14. Located on lateral side 30d is the front opening 32. The width of the front opening 32 generally corresponds to the width of the metal USB plug 12. Opposite the front opening 32 on lateral side 30b of upper housing 16, is hole 37, which is a generally circular cutout located generally in the center of the lateral side 30b. Lateral sides 30a and 30c are opposite each other on upper housing 16.

In FIG. 3, the coupling slots 35 are rectangular slots cut into the lateral sides 30. Lateral side 30a contains coupling slots 35a, 35b, 35c and 35d; whereas lateral side 30 contains coupling slots 35g, 35h, 35i, and 35j. Two additional coupling slots 35, coupling slots 35e and 35f, are located on lateral side 30b, with one on each side of hole 37. In one embodiment of the present invention, there are a total of ten coupling slots 35, but in other embodiments there may be more or less coupling slots 35 present. In one alternative of the present invention, coupling slots may be round, triangular, or any other polygonal shape. Additionally, in yet another alternative embodiment of the present invention, coupling slots 35 may be located on lower housing 14, and in place of coupling slots 35, male coupling tabs 42 are located on upper housing 16.

During assembly of the press/push flash drive 10, the lower housing 14 and the upper housing 16 are snapped together, thereby encasing the metal case 24, PCBA 26 end cap 29, pin 28, and PCB support 22. The front opening 32 permits the metal USB plug 12 to extend from the press/push flash drive 10 when the press/push button 11 is toggled by the user. The fingerprint cut-out area 31 serves to provide access to the fingerprint sensor 13 when the press/push button 11 is toggled by the user.

Referring now to FIG. 4, a top angular view of lower housing 14 is shown in accordance with an embodiment of the present invention. The lower housing 14 is shown to include a front opening 44, lateral sides 40 (40a-40d), snap coupling tabs 42 (42a-42j), a dip 46, and a rectangular face 41. The lower housing 14 is comprised substantially of an elastic and durable material, such as injection molded plastic.

As shown in FIG. 4, the lower housing 14 is be shaped generally as a rectangular box with a generally rectangular shaped front opening 44 on one end and lateral sides 40 protruding upward from the outer perimeter of the lower housing 14. The lateral sides 40 of lower housing 14 are subdivided into lateral sides 40a, 40b, 40c and 40d. The dimensional footprint of lower housing 14 is such that the rectangular face 41 of lower housing 14 is substantially similar to that of rectangular face 38 of upper housing 16, and lateral sides 30 of upper housing 16. Located on the interior face of lateral side 40a are snap coupling tabs 42a, 42b, 42c, and 42d. Located on the interior face of lateral side 40b are snap coupling tabs 42e and 42f. An additional four snap coupling tabs located on the interior face of lateral side 40c, snap coupling tabs 42g, 42h, 42i, and 42j. Snap coupling tabs 42 are generally rectangular protrusions with a beveled edge to assist in joining the lower housing 14 with the upper housing 16. In one embodiment of the present invention, lower housing 14 has 10 snap coupling tabs 42—one for each coupling slot 35 on upper housing 16. In alternative embodiments of the present invention, there may be fewer or greater numbers of snap coupling tabs 42 on lower housing 14 (i.e., 6, or 12). Additionally, the snap coupling tabs 42 may take on other conformations, such as, for example, spherical or triangular protrusions. In an alternative embodiment of the present invention, coupling slots 35 may be instead found on the lower housing 14, with coupling slots 35 located internal to lower housing 14.

During assembly of the press/push flash drive 10, the lower housing 14 and the upper housing 16 are snapped together, thereby encasing the metal case 24, PCBA 26 end cap 29, pin 28, and PCB support 22. The front opening 44 permits the metal USB plug 12 to extend from the press/push flash drive 10 when the press/push button 11 is toggled by the user. The snap coupling tabs 42 interlock with the snap coupling slots 35 of the upper housing 16 when connected, creating a durable shell.

Referring now to FIG. 5, a top angular view of PCB support 22 is shown in accordance with an embodiment of the present invention. The PCB support 22 is shown to include a PCB support platform 52, four snap coupling tabs 54, two lateral support sides 56, a front support side 55, two protrusion tabs 50, and two slits 51. In an embodiment of the present invention, the PCB support 22 is a resilient and durable component, manufactured from, by example, a single step injection molding.

As shown in FIG. 5, the PCB support 22 is generally a rectangular box with a rectangular support platform 52. Located on two opposing sides of support platform 52 are lateral support sides 56, which rise vertically off of support platform 52. On another side, between lateral support sides 56, is front support 55. Together, lateral support sides 56 and front support side 55 form a U-shaped barrier along three of PCB support 22's edges. Protrusion tabs 50 are located at the two corners of PCB support 22 where lateral support sides 56 interface with front support side 55. At these corners, protrusion tabs 50 are located on top of front support side 55 and lateral support sides 56 such that small rectangular, or square, regions overhang above support platform 52. In other embodiments of the present invention, the overhang of protrusion tabs 50 may be triangular, round, or have any other conformation with greater than four edges. These overhanging regions of protrusion tabs 50 serve as a physical boundary, keeping the inserted PCB pressed snugly down into support platform 52.

Located externally, on each end of lateral support sides 56 is a snap coupling tab 54. Snap coupling tabs 54 are small pieces of plastic that are molded such that they protrude off of the outer surface of each lateral support side 56.

When PCB support 22 is inserted into metal USB plug 12 of metal case 24, snap coupling tabs 54 protrude through complementary holes located in metal USB plug 12, thereby locking PCB support 22 in place. In alternative embodiments of the present invention, small divots in the surface of lateral support sides 56 may replace snap coupling tabs 54, and instead a male coupling tab is located internal to male plug 12, thereby securing PCB support 22 in place, in a similar fashion. Slits 51, between lateral sides 56 and support platform 52 are small voids in the material (i.e., of the plastic used to create PCB support 22), of roughly equal length to the length of snap coupling tabs 54. Slits 51 allow the ends of lateral sides 56 to bend inward when PCB support 22 is inserted into metal USB plug 12, ensuring that snap coupling tabs 54 remain intact, and are not broken off by sliding against the inner walls of metal USB plug 12.

Referring now to FIG. 6, a top angular view 61 of the printed circuit board assembly (PCBA) 26 and a bottom angular view 67 of the PCBA 26 is shown in accordance with an embodiment of the present invention. PCBA 26 is comprised of a PCB substrate 68, contact fingers 62, a front portion 63, fingerprint sensor 13, controller circuit 64, and a memory circuit 65.

As shown in top angular view 61, the PCBA 26 is a generally rectangular shaped PCB substrate 68 with a narrowed front portion 63 with four contact fingers 62 attached on the top face of the same. The front portion 63 of the PCB substrate 68 is of a smaller width than the PCB substrate 68, and it is generally similar to the internal width of the metal USB plug 12. On the end opposite the front portion 63 is the fingerprint sensor 13. The fingerprint sensor 13 is a generally rectangular shaped component affixed to the surface of the PCB substrate 68.

As shown in bottom angular view 67, a controller circuit 64 and a memory circuit 65 are located on the bottom of PCBA 26. Controller circuit 64 and memory circuit 65 can be attached to the PCB substrate 68 via the use of, for example, surface mount technology (SMT) or chip on board (COB) methods. In alternative embodiments of the present invention, one or both of controller circuit 64 and memory circuit 65 may be positioned on the top of PCBA 26, adjacent to fingerprint sensor 13.

The front portion 63 of PCBA 26 may fit within the metal USB plug 12. The contact fingers 62 are metallic and electronically interface the press/push flash drive 10 to the host device, such as a personal computer. Through contact fingers 62, controller circuit 64 is capable of communicating with the host device over a variety of protocols, such as, but not limited to, Serial Peripheral Interface (SPI), Secure Digital (SD), Universal Serial Bus (USB), Enhance Universal Serial Bus (EUSB), Peripheral Component Interconnect Express (PCIE), and the IEEE 1394 interface (sometimes referred to as "firewire"). Fingerprint sensor 13, together with controller circuit 64, is capable of reading a user's fingerprint when rubbed across fingerprint sensor 13. This functionality enables a user to secure in its entirety, or any portion thereof, the data content held within memory circuit 65 from unauthorized access Referring now to FIG. 7, a top angular view 71 of the end cap 29 and a bottom angular view 75 of the end cap 29 is shown in accordance with an embodiment of the present invention. End cap 29 is shown to include a PCB support surface 74, an exposed section 73, tabs 78, and a bottom surface 77. In one embodiment of the invention, the end cap 29 is formed from a single piece of resilient material such as, for example, injection molded plastic.

End cap 29 is further divided into two functional regions—PCB support surface 74 and exposed portion 73. PCB support surface 74 is a flat and substantially rectangular region of plastic. Upon inserting the end cap 29 into the back of metal case 24, the PCB support surface 74 is positioned underneath PCBA 26. More specifically, the PCB support surface 74 is below the PCB substrate 68 upon which fingerprint sensor 13 is positioned in a similar manner as that of support platform 52 of PCB support 22 at the front of metal case 24 in metal USB plug 12. Tabs 78 are small plastic protrusions protruding from the bottom surface 77 of the plug portion 72 of end cap 29. Two tabs 78 serve to physically lock end cap 29 into metal case 24. In an embodiment of the present invention, tabs 78 are rectangular in shape, but in other embodiments of the present invention they may be in any other geometric shape, such as, but not limited to, circular or triangular polyhedrons. Additionally, in other embodiments of the present invention, greater or fewer than two tabs 78 may be used to snap couple end cap 29 to metal case 24. When end cap 29 is inserted and snap coupled into metal case 24, in an embodiment of the present invention, exposed portion 73 becomes flush with the rear opening of metal case 24.

Referring now to FIG. 8, a top angular view 613 of the metal case 24 and a detail view 615 of the slide through (or "slide-thru") support tabs 86 is shown in accordance with an embodiment of the present invention. Metal case 24 is shown to include a top surface 80, a metal USB plug 12, a fingerprint sensor cutout 85, snap coupling slots 84, a finger area 83, a press/push button 11, snap coupling slots 91, cuts 89, a rear opening 88, slide-through support tabs 86, and lateral sides 87. Metal case 24 is comprised of sheet metal, and may be formed from a single piece of folded sheet metal; it may also be formed from multiple, separately formed components, which are then cross-linked together.

As shown in the top angular view 613, the metal case 24 is a substantially rectangular hollow tube with a metal USB plug 12 on one end and a generally rectangular shaped rear opening 88 on the other. The metal USB plug 12 is shaped in conformance with the USB standard for a USB connector. Along the lateral sides of the metal USB plug 12 are four snap coupling slots 91, which are slits cut into the leading edge of the two lateral sides of the metal USB plug 12 and the rear edges of the lateral sides of the metal USB plug 12. The rear opening 88 is large enough for the PCBA 26 to be inserted through, and is generally rectangular in shape.

Located on top surface 80 of metal case 24 is fingerprint sensor cutout 85. Fingerprint sensor cutout 85 is situated on the top surface 80 near the rear opening 88, and it is a rectangular cut out that spans the width of the top surface 80. On the bottom of metal case 24, proximal to rear opening 88, are snap coupling slots 84. Located adjacent to fingerprint sensor cutout 85 on top surface 80 of metal case 24 is finger area 83. Finger area 83 is a flat recessed area terminated by press/push button 11, which has a locking tab 81 on either side, at the edge of top surface 80 of metal case 24. The press/push button 11 is located about half the length of metal case 24 away from fingerprint sensor cutout 85. In other embodiments of the present invention, the area of finger area 83 may be smaller, and press/push button 11 is located closer to fingerprint sensor 13.

On either side of press/push button 11 and finger area 83 are cuts 89 on the top surface 80 of metal case 24. Cuts 89 are two incisions into the top surface 80 of the metal case 24 that substantially run parallel with the lateral sides 87, with a small deviation in the cut path near the end of the cut 89 closest to the metal USB plug 12. Along each of cut 89, the deviation in the cut 89 descends off of top surface 80 and onto lateral sides 87, forming a 'u' shaped cut on lateral sides 87. The metal of lateral sides 87 within the u-shaped deviation of the cuts 89 is then folded up, 180 degrees, to form locking tabs 81 which protrude above top surface 80 of metal case 24. Cuts 89 are responsible for making the press/push button 11 and finger area 83 region of top surface 80 of metal case 24 flexible. Upon application of pressure from a user's finger, the region of top surface 80 of metal case 24 that lies within cuts 89 flexes inward, and locking tabs 81 become flush with top surface 80 of metal case 24, allowing metal USB plug 12 to be retracted and extended, as will be discussed in detail shortly.

In the detail view 615, a close up of PCBA slide-through support tabs 86 is shown. The relative location of PCBA slide-through support tabs 86 on lateral side 87 of metal case 24 can be better seen in the top angular view 613. Similar to the manner in which locking tabs 81 are created, PCBA slide-through support tabs 86 are also created by cutting and folding. In the detail view 615, the PCBA slide-through support tab 86a has been created by a the u-shaped cut into lateral side 87, and the sheet metal within the u-shaped cut then being folded 90 degrees inward relative to the metal case 24. Located near the PCBA slide-through support tab 86a is PCBA slide-through support tab 86b, which is created by u-shaped cut in lateral side 87. The orientation of the u-shaped cut into the lateral side 87 of metal case 24 is inverted relative to the u-shaped cut into lateral side 87 that formed the PCBA slide-through support tab 86a. The sheet metal of lateral side 87 of metal case 24 is then also folded 90 degrees inward relative to metal case 24, forming a second platform internal to metal case 24. The arrangement of slide-thru tab 86a in respect to slide-thru tab 86b is such that both slide-thru tabs 86 are substantially parallel with each other and the top surface 80, but at a slight vertical offset such that one tab is closer than the other to top surface 80 of metal case 24. Because of this offset, in an embodiment of the present invention, when PCBA 26 is inserted into metal case 24 it slides between the two PCBA slide-through tabs 86. In this situation, PCBA slide-through tab 86a is in contact with top surface of PCB substrate 68, while PCBA slide-through tab 86b is in contact with the bottom surface of PCB substrate 68. This arrangement ultimately creates a pinching force that holds PCBA 26 securely in the center of metal case 24. In an embodiment of the present invention, there are two sets of PCBA slide-through tabs 86, one on each of metal case 24's lateral sides 87. In alternative embodiments of the present invention, there may be more than two PCBA slide-through tabs 86 on each lateral side 87, and/or the PCBA slide-through tabs 86a and 86b may be created by a single 'N'-shaped cut in lateral sides 87.

The metal case 24 serves as a housing for the electronics of press/push flash drive 10, assists in coupling drive 10 to a host device, and is responsible for the sliding extended/retracted functionality of drive 10. Metal USB plug 12 houses the electronics which interface press/push flash drive 10 to the host device. Fingerprint sensor cutout 85 facilitates the user's access to fingerprint sensor 13 when press/push flash drive 10 is completely assembled, in an embodiment of the present invention. The snap coupling slots 84 interface with the end cap 29 upon its insertion into rear opening 88, and ensure that rear opening 88 is securely closed by end cap 29, such that PCBA 26 and its attached electronic circuitry can not accidentally fall out of metal case 24.

Referring now to FIG. 9, a top angular view of step 1 of the manufacturing process of press/push flash drive 10 is shown in accordance with a method of the present invention. In a first step of the manufacturing process, the PCB support 22 is shown to be inserted into metal USB plug 12 of the metal case 24.

As shown in FIG. 9, the PCB support 22 is slid into the metal USB plug 12 in the direction of force 90 until snap coupling tabs 54 are each aligned with their respective snap coupling slots 91 on metal USB plug 12. For example, the snap coupling tab 54c is coupled with slot 91c and snap coupling tab 54a is coupled to snap coupling slot 91a and so on. The width of PCB support 22 is generally equal to that of the internal width of metal USB plug 12. This ensures that the lateral sides 56, upon which snap coupling tabs 54 are located, fit generally flush against the interior walls of metal USB plug 12. The slits 51 allow for the ends of lateral sides 56 to bend inward of PCB support 22, as shown by force 94. The bending of the lateral sides 56 inward relative to the PCB support 22 renders insertion of the PCB support 22 possible without snapping off snap coupling tabs 54. PCB support 22 is inserted into metal USB plug 12 so that snap coupling tabs 54a and 54b are inserted into snap coupling slots 91a and 91b, respectively; and upon alignment of snap coupling tabs 54c and 54d with snap coupling slots 91c and 91d, respectively.

The lateral side 56 flexes inwardly during insertion of the PCB support 22 into the metal USB plug 12, and it resumes its shape upon complete insertion into the metal USB plug 12. This locks the PCB support 22 within the interior of the metal USB plug 12.

Referring now to FIG. 10, a top angular view of step 2 of the manufacturing process of press/push flash drive 10 is shown in accordance with a method of the present invention. In a second step of the manufacturing process, the PCBA 26 is shown inserted into the metal case 24.

As shown in FIG. 10, PCBA 26 is inserted with the leading edge 102 facing into the metal case 24 through the rear opening 88 thereof, in the direction of the force 100. As the PCBA 26 slides into the metal case 24, the outer lateral edges 105 of the PCBA 26 slide in the area between the PCBA slide-through tabs 86, substantially centering the PCBA 26 within the metal case 24. The PCBA 26 is completely inserted into the metal case 24 when the leading edge 102 of PCBA 26 covers the top of the PCB support 22 and is generally flush with the outer edge of the metal USB plug 12. Additionally, the fingerprint sensor 13 is exposed through the fingerprint sensor cutout 85 when the PCBA 26 is fully inserted into the metal case 24.

Referring now to FIG. 11, a bottom angular view of step 3 of the manufacturing process of press/push flash drive 10 is shown in accordance with a method of the present invention. In the third step of the manufacturing process, the end cap 29 is shown inserted into the metal case 24.

As shown in FIG. 11, the end cap 29 is shown being inserted into the metal case 24 along the force 110. The end cap 29 enters the rear opening 88 of metal case 24 in such a manner that plug portion 72 of end cap 29 is secured by a generally tight friction fit between the interior face of the bottom surface 115 of the metal case 24 and the bottom surface of PCBA 26. This, in one embodiment of the invention, prevents the PCBA 26 from shifting or moving within the metal case 24. The tabs 78 protrude through the snap coupling slots 84 of metal case 24 upon alignment, thereby securing end cap 29 within metal case 24 permanently for normal use.

Once inserted, the end cap 29 provides structural support to the PCBA 26 within the metal case 24 by supporting the rear portion of the PCBA 26 via the insertion of the plug portion 72 into the gap between the bottom of the PCBA 26 and the bottom surface 115 of the metal case 24. This prevents damage to the PCBA 26 when the press/push button 11 is toggled by the user. The end cap 29 also prevents foreign matter from entering the rear opening 88 of the metal case 24, thereby protecting the PCBA 26 from damage.

Referring now to FIG. 12 the slim USB device 120 is shown in accordance with an embodiment of the present invention. The PCB support 22 is shown to be securely in place in metal USB plug 12 of metal case 24. PCBA 26 is shown securely in place within metal case 24, and end cap 29 is shown securely in place in the rear of metal case 24. PCBA 26 is held firmly in place by the PCB support platform 52 of the PCB support 22; four PCBA slide-through . tabs 86 in the metal case 24; and the plug portion 72 of the end cap 29. Additionally, the fingerprint sensor 13 is flush with top surface 80 of metal case 24, rendering it accessible for use by the user. The slim USB device 120 is a functional flash memory device that can be used to interface with electronic devices.

Referring now to FIG. 13, a top angular view of step 4 of the manufacturing process of press/push flash drive 10 is shown in accordance with a method of the present invention. In the fourth step of the manufacturing process, the key ring 18 is attached to the upper housing 16.

As shown in FIG. 13, pin 28 is inserted into the pin hole 133 in the direction of force 139 with the flanged end 131 of the pin 28 on the end opposing the end inserted through the pin hole 133 until the flanged end 131 rests generally flush against the rear interior face of the upper housing 16. The pin hole 133 is a hole of a diameter slightly larger than that of the pin 28 and smaller in diameter than the diameter of the flanged end 131 of the pin 28, thus ensuring that pin 28 cannot be pulled completely through pin hole 133. Key ring 18 is subsequently threaded through key ring hole 132 in pin 28. The attachment of key ring 18 ensures that pin 28 can not recede into upper housing 16, or the body of the completed press/push flash drive 10. In an embodiment of the present invention, pin 28 and pin hole 133 are round although other suitable shapes are anticipated.

The round shape of pin 28 allows for the press/push flash drive 10 to rotate axially about the pin 28 while attached to, by example, a key chain. This renders the press/push flash drive 10 easier to handle, and it decreases the likelihood of breaking due to torsion and twisting forces. In alternative embodiments of the present invention, pin 28 and pin hole 133 may be other shapes that don't allow the press/push flash drive 10 to rotate axially about the pin 28, such as, for example, a triangular, square, or any other geometric shape. Additionally, in alternative embodiments of the present invention, the presence of a key ring may not be desired at all, and pin 28, key ring 132, and pin hole 133 are not present.

Referring now to FIG. 14, a top angular view of step 5 of the manufacturing process of press/push flash drive 10 is shown in accordance with a method of the present invention. In the fifth step of the manufacturing process, the slim USB device 120 is inserted into the upper housing 16.

As shown in FIG. 14, the slim USB device 120 is pressed into the upper housing 16 in the direction of force 149 so that the top surface 80 of metal case 24 is pressed against the inside of the rectangular face 38 of upper housing 16 while the end cap 29 abuts the rear of the flanged end 131 of the pin 28. The alignment of the slim USB device 120 with the upper housing 16 is such that the lock tabs 81 of the metal case 24 are seated into the retracted lock grooves 36 of the upper housing 16. When seated, the lateral sides 87 of metal case 24 abut the interior of the lateral sides 30 of upper housing 16, limiting the movement of slim USB device sub-assembly 120 to the Y-axis.

Referring now to FIG. 15, a top angular view of step 6 of the manufacturing process of press/push flash drive 10 is shown in accordance with a method of the present invention. In the sixth step of the manufacturing process, the lower housing 14 is attached to the upper housing 16, encapsulating the slim USB device 120.

As shown in FIG. 15, the lower housing 14 is pressed in the direction of force 150 onto the upper housing 16. Lower housing 14 and upper housing 16 are aligned such that the interior surface of the lateral sides 40 of the lower housing 14 interface snugly within the exterior surfaces of lateral sides 30 of upper housing 16 (i.e., the interior face of lateral side 40*a* snugly adjoins the outer wall of lateral side 30*a*). Additionally, when lower housing 14 and upper housing 16 are connected, the snap coupling tabs 42 of lower housing 14 lock into the snap coupling slots 35 of upper housing 16. In FIG. 15, snap coupling slots 35 and snap coupling tabs 42 have been aligned so that snap coupling tab 42*a* locks with snap coupling slot 35*a*, snap coupling tab 42*b* locks with snap coupling slot 35*b*, snap coupling tab 42*c* locks with snap coupling slot 35*c*, and so on up to tab 42*j* and slot 35*j*. In an alternative embodiment of the present invention upper housing 16 and lower housing 14 are permanently cross-linked using ultrasonic press bonding independently of, in conjunction with, the snap coupling slot/tab method.

Referring now to FIG. 16, a top outline view 617 and a side outline view 619 of press/push flash drive 10 is shown with metal USB plug 12 extended, in accordance with an embodiment of the present invention. Top outline view 617 shows that when metal USB plug 12 is extended, lock tabs 81 are positioned within deployed lock grooves 34. Additionally, when metal USB plug 12 is extended, the fingerprint sensor 13 is accessible to the user through the fingerprint area cut-out 31. In side outline view 619, a side outline view of press/push flash drive 10 with USB plug 12 extended is shown. In addition to showing deployed lock grooves 34 and retracted lock grooves 36, the PCBA 26 is shown resting between the PCBA slide-through tabs 86a and 86b.

Referring now to FIG. 17, a top outline view 621 and a side outline view 623 are shown of press/push flash drive 10 with USB plug 12 retracted, in accordance with an embodiment of the present invention. When metal USB plug 12 is retracted, fingerprint sensor 13 is hidden underneath the fingerprint area cover 33 of the upper housing 16. Hiding fingerprint sensor 13 underneath the fingerprint cover area 33 protects the sensor from physical damage, and it protects the press/push flash drive 10 from intrusion of foreign matter during storage or transportation, such as in a pocket.

To switch from press/push flash drive 10 with extended metal USB plug 12 of . FIG. 16 to retracted USB plug 12 of FIG. 17, finger area 83 and press/push button 11 of metal case 24 are depressed (pressure is applied downward, towards lower housing 14), and pushed/slid backwards, towards the rear of the device, by a user using, for example, his or her finger. The downward pressure moves lock tabs 81 out of the retracted grooves 34, and the backward motion pulls the slim USB device 120 backwards. When the user removes the applied pressure, and the slim USB device 120 is moved completely backwards, lock tabs 81 secure the slim USB device 120 into retracted lock grooves 36, preventing the metal USB plug 12 from being inadvertently extended.

FIG. 18(a) shows an angular back and side view of a side-switching press/push flash drive 180 in accordance with an embodiment of the present invention. FIG. 18(b) shows an angular front and side view of the side-switching press/push flash drive 180 in accordance with an embodiment of the present invention. Side-switching press/push flash drive 180 is substantially similar to press/push flash drive 10 except that the switch 181, for deploying metal USB plug 12 and fingerprint sensor 13, is located on lateral sides 200a and 210a, of upper housing 186 and lower housing 184, respectively. Switch 181 slides back and forth along slot 187, and, analogously to press/push button 11 of press/push flash drive 10, must first be depressed inwards, towards the body of flash drive 180, in order to be moved between its two locked positions retracted position 188 of FIG. 18(a), and extended position 185 of FIG. 18(b). To accommodate the side switching mechanism of press/push flash drive 180, some of the components comprising press/push flash drive 10 have been modified, but still serve substantially the same purpose as previously disclosed for press/push flash drive 10.

Referring now to FIG. 19, an exploded view of the components comprising press/push flash drive 180 is shown. Similar to press/push flash drive 10, side-switching press/push flash drive 180 is comprised of lower housing 184, upper housing 186, metal case 194, PCB support 22, PCBA 26, end cap 199, key ring 18, and pin 28. PCBA 26, PCB support 22, key ring 18, and pin 28 are the same components as used in the press/push flash drive 10.

Referring now to FIG. 20(a), a top angular view of upper housing 186 of side-switching press/push flash drive 180 is shown in accordance with an embodiment of the present invention. The upper housing 186 is shown to include a fingerprint cut-out area 201, a top face 208, lateral sides 200, snap coupling slots 205, a USB plug opening 202, and a switch slot 209.

As shown in FIG. 20(a), the upper housing 186 is generally shaped as a rectangular box with a USB plug opening 202 at one end and bounded by the lateral sides 200. The lateral sides 200 are a lip protruding from the bottom of the top face 208 about the outer boundaries of the upper housing 186. The lateral sides 200 are beveled about the center inward, resulting in an outer edge that is thinner than the inner edge and recessed inward. The switch slot 209 is generally centered on the lower beveled edge of the lateral side 200a, resulting in a cut slot in the lower beveled edge of the lateral side 200a and a recessed area cut into the lower edge of the lateral side 200a. Two of a plurality of snap coupling slots 205 are shown as rectangular cut slots in the beveled edge of the lateral side 200a.

In FIG. 20(a), the USB plug opening 202 is rectangularly shaped and of a width less than the width of the front end of the upper housing 186, with one end bounded by lateral side 200a and another bounded by lateral side 200d, with both end points terminating at the interior facing edges of the same. A rectangular-shaped fingerprint cut-out area 201 is cut into the upper housing rectangular face 208 of the upper housing 186 generally near the middle of the upper housing 186.

During assembly of the side-switching press/push flash drive 180, the lower housing 184 and the upper housing 186 are snapped together, thereby encasing the metal case 194, PCBA 26 end cap 199, pin 28, and PCB support 22. The USB plug opening 202 permits the metal USB plug 12 to extend from the side-switching press/push flash drive 180 when toggled into the deployed position 185 by the user. The fingerprint cut-out area 201 serves to provide access to the fingerprint sensor 13 when toggled into the deployed position 185 by the user.

Referring now to FIG. 20(b), a bottom angular view of upper housing 186 of side-switching press/push flash drive 180 is shown in accordance with an embodiment of the present invention. The upper housing 186 is shown to include a fingerprint cut-out area 201, a top face 208, lateral sides 200, snap coupling slots 205, a USB plug opening 202, a switch slot 209, a pin aperture 207, a retracted lock groove 203, an extended lock groove 206, and an intermediate lock groove 204.

As shown in FIG. 20(b), the upper housing 186 is generally shaped as a rectangular box with a USB plug opening 202 at one end and bounded by the lateral sides 200. The lateral sides 200 are a lip protruding from the bottom of the top face 208 about the outer boundaries of the upper housing 186. The lateral sides 200 are beveled about the center inward, resulting in an outer edge that is thinner than the inner edge. The switch slot 209 is generally centered on the lower beveled edge of the lateral side 200a, resulting in a cut slot in the lower beveled edge of the lateral side 200a and a recessed area cut into the lower edge of the lateral side 200a. A pin aperture 207 is cut into the lateral face 200b, and it is shaped generally as a circle. Eight snap coupling slots 205 are shown as rectangular cut slots in the beveled edge of the lateral side 200a. Snap coupling slots 205e, 205f, 205g, and 205h are located on the beveled edge of lateral face 200c, and they are spaced equidistantly with respect to each other. Snap coupling slots 205d and 205C are on lateral side 200b, with the pin aperture 207 between them on lateral side 200*b*. Snap couplings 205*a* and 205*b* are located on either side of the switch slot 209, and they are equidistantly separated from the switch slot 209.

In FIG. 20(*b*), the USB plug opening 202 is rectangularly shaped and of a width less than the width of the front end of the upper housing 186, with one end point bounded by lateral side 200*a* and another bounded by lateral side 200*d*, with both end points terminating at the interior facing edges of the same. A rectangular-shaped fingerprint cut-out area 201 is cut into the top face 208 of the upper housing 186, generally near the middle of the upper housing 186.

In FIG. 20(*b*), located on the inside of top face 208, central and adjacent to lateral side 200*a*, are retracted lock groove 203 and extended lock groove 206, connected by intermediate groove 204. Retracted lock groove 203 and extended lock groove 206 are small, generally square, notches or voids on the interior face of the top face 208. Retracted lock groove 203 is located near the end of switch slot 209 furthest from the USB plug opening 202, and the extended lock groove 206 is located nearest the end of switch slot 209 closest to USB plug opening 202. Grooves 203 and 206 are connected by intermediate groove 204. Intermediate groove 204 is a notch on the interior face of top face 208, and it is generally of the same depth as grooves 206 and 203. Together, grooves 203, 204, and 206 form a wide, 'u'-shaped notch, or void of material, on the interior face of the top face 208.

During assembly of the side-switching press/push flash drive 180, the lower housing 184 and the upper housing 186 are snapped together, thereby encasing the metal case 194, PCBA 26 end cap 199, pin 28, and PCB support 22. The USB plug opening 202 permits the metal USB plug 12 to extend from the side-switching press/push flash drive 180 when toggled into the deployed position 185 by the user. The fingerprint cut-out area 201 serves to provide access to the fingerprint sensor 13 when toggled into the deployed position 185 by the user. Slot 209, through which switch 181 protrudes for access by a user, allows switch 181 to slide back and forth to the deployed position 185 or the retracted position 188. Snap coupling slots 205 perform substantially the same function as snap coupling slots 35 of upper housing 16, of press/push flash drive 10. The extended lock groove 206 and the retracted lock groove 203 serve to lock the switch 181 in either the deployed position 185, or retracted position 188, respectively. Intermediate lock groove 204 is used as a channel to guide the switch 181 between deployed position 185 and retracted position 188.

Referring now to FIG. 21, a top angular view of lower housing 184 of side-switching press/push flash drive 180 is shown, in accordance with an embodiment of the present invention. The lower housing 184 is shown to consists of a rectangular bottom face 211, lateral sides 210, a USB plug opening 218, a notch 215, snap coupling tabs 212, a dip 217, a retracted lock groove 213, an extended lock groove 216, and an intermediate lock groove 214.

As shown in FIG. 21, the lower housing 184 is generally shaped as a rectangular box with a USB plug opening 218 at one end and bounded by the lateral sides 210. The lateral sides 210 are a lip protruding from the bottom of the rectangular bottom face 211 about the outer boundaries of the lower housing 184. The notch 215 is generally centered on the top edge of the lateral side 210*a*, resulting in a a recessed area cut into the top edge of the lateral side 200*a* by which the switch 181 is accommodated. A dip 217 is cut into the lateral face 200*b*, and it is shaped generally as a semi-circular notch cut into the top face of the lateral face 210*c*. Eight snap coupling tabs 212 are shown as rectangular-shaped protuberances protruding from the interior face of the lateral sides 210. The snap coupling tabs are placed along the lateral sides 210 to correspond with the location of the snap coupling slots 205 along the lateral sides 200 of the upper housing 186.

In FIG. 21, the USB plug opening 218 is rectangularly shaped and of a width less than the width of the front end of the lower housing 184, with one end point bounded by lateral side 210*d* and another bounded by lateral side 210*c*, with both end points terminating at the interior facing edges of the same.

In FIG. 21, located on the inside of the rectangular bottom face 211, central and adjacent to lateral side 210*a*, are retracted lock groove 213 and extended lock groove 216, connected by intermediate groove 214. Retracted lock groove 213 and extended lock groove 216 are small, generally square, notches or voids on the interior face of the rectangular bottom face 211. Retracted lock groove 213 is located near the end of notch 215 furthest from the USB plug opening 218, and the extended lock groove 216 is located nearest the end of notch 215 closest to USB plug opening 218. Grooves 213 and 216 are connected by intermediate groove 214. Intermediate groove 214 is a notch on the interior face of rectangular bottom face 211, and it is generally of the same depth as grooves 216 and 213. Together, grooves 213, 214, and 216 form a wide, 'u'-shaped notch, or void of material, on the interior face of the rectangular bottom face 211.

During assembly of the side-switching press/push flash drive 180, the lower housing 184 and the upper housing 186 are snapped together, thereby encasing the metal case 194, PCBA 26 end cap 199, pin 28, and PCB support 22. The USB plug opening 218 permits the metal USB plug 12 to extend from the side-switching press/push flash drive 180 when toggled into the deployed position 185 by the user. The notch 215 allows side switch 181 to slide back and forth to the deployed position 185 or the retracted position 188. Snap coupling tabs 212 perform substantially the same function as snap coupling tabs 42 of lower housing 14, of press/push flash drive 10. The extended lock groove 216 and the retracted lock groove 213 serve to lock the switch 181 in either the deployed position 185, or retracted position 188, respectively. Intermediate lock groove 214 is used as a channel to guide the switch between deployed position 185 and retracted position 188.

Figure 22:
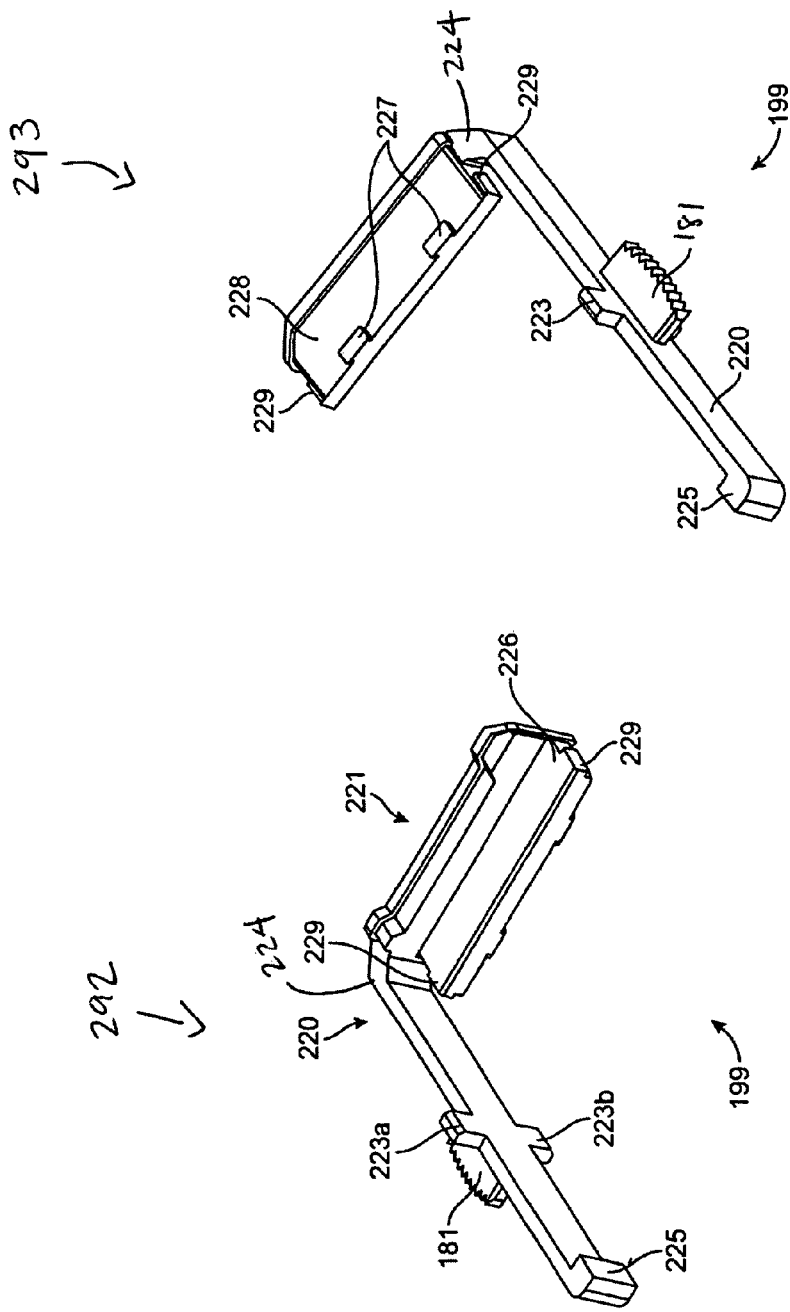
Figure 27:
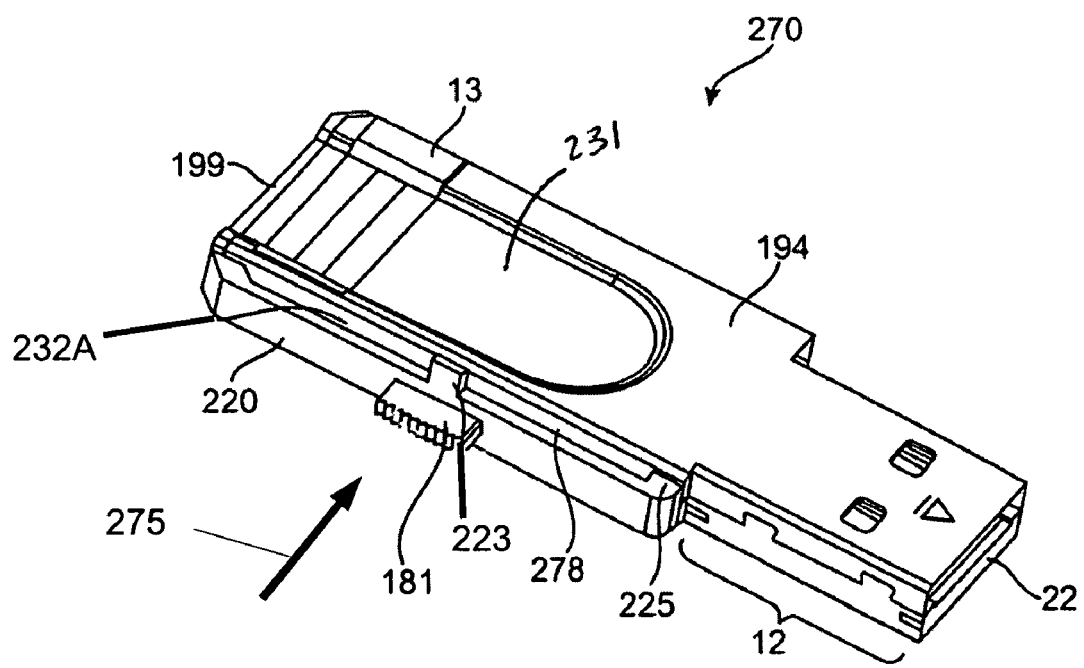
Figure 28:
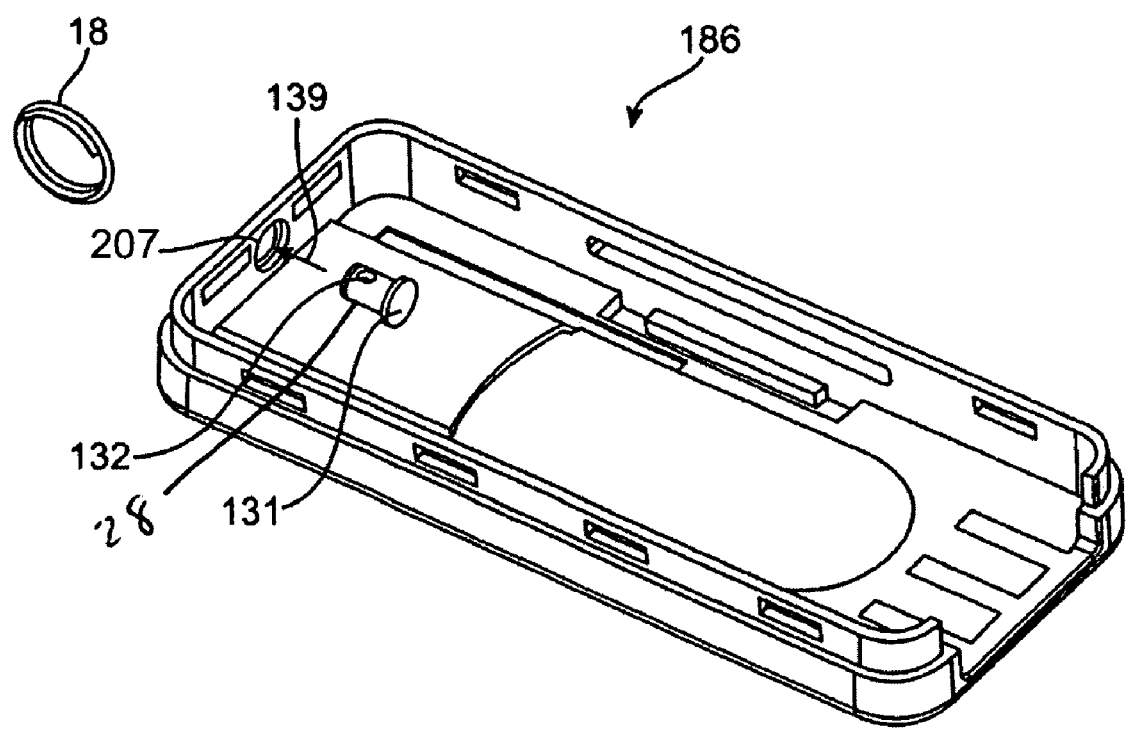
Figure 33:
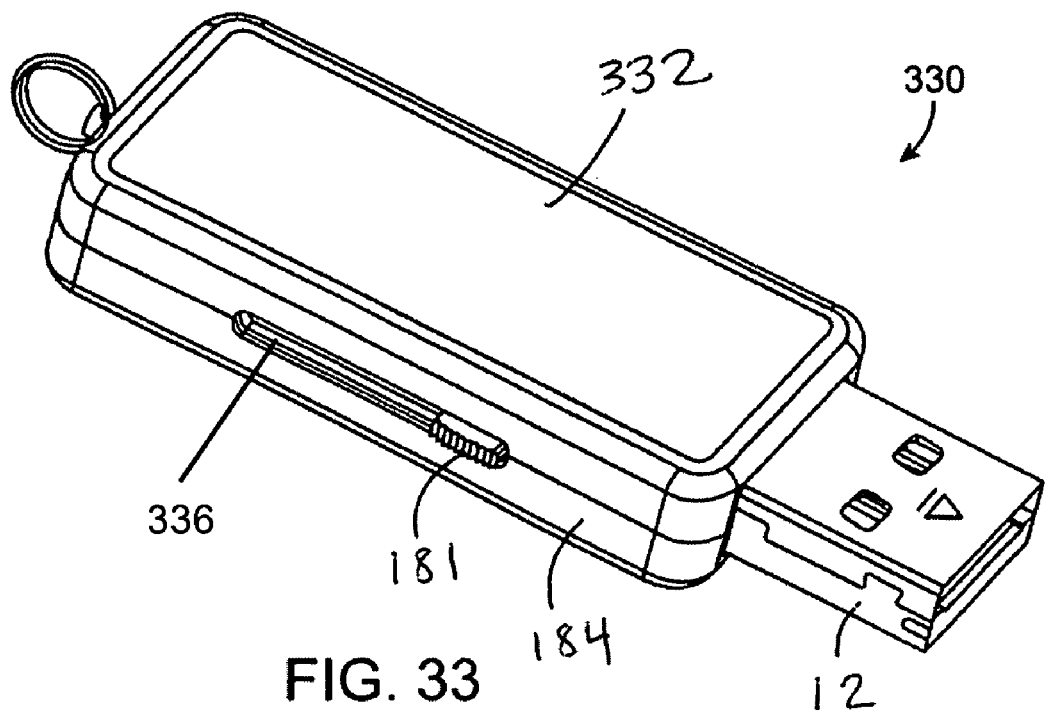

Referring now to FIG. 22, a top angular view 292 of end cap 199 and a bottom angular view 293 of end cap 199 is shown in accordance with an embodiment of the present invention. The end cap 199 is shown to consist of a switch 181, an extension arm 220, a plug portion 221, a PCB support surface 226, two snap coupling tabs 227, a bottom face 228, a spacer 225, an angled end 224, two guide posts 223, and two lock tabs 229.

As shown in the top angular view 292, the end cap 199 is a generally L-shaped construct resulting from a connection of one end of the plug portion 221 to the extension arm 220. The plug portion 221 is shaped generally as a rectangular box with dimensions that generally correspond to the width of the end of the metal case 194 opposite the metal USB plug 12. Attached to the plug portion 221 is the PCB support surface 226, which is generally a rectangular protrusion extending from the face of the plug portion 221 facing inward relative to the junction of the plug portion 221 and the extension arm 200. The PCB support surface 226 is generally flat along the top edge, with a lock tab 229 hanging from each of its lateral surfaces for a total of two lock tabs. The lock tab 229 is a thin, generally square shaped protuberance derived from a cut into the surface of the PCB support surface 226 that has been folded inward relative to the PCB support surface 226.

The extension arm 220 is generally a long, slender rectangular box joined to the plug portion 221 at one end. The extension arm 220 has an angled end 224 that joins to one lateral face of the plug portion 221, two guide posts 223 protruding from the dorsal and ventral faces, a switch 181 protruding from the outward facing lateral side, and a curved spacer 225 on the end opposite the angled end 224. The guide post 223a is a generally rectangular shaped protuberance protruding from the center of the dorsal face of the extension arm 221. The guide post 223b is of the same configuration, however it protrudes from the center of the ventral face of the extension arm 221. The switch 181 is a generally rectangular protuberance protruding from generally the center of the the lateral face of the extension arm 220 that is facing outward relative to the junction of the plug portion 221 and the extension arm 220. It has a saw tooth shaped outer face. The spacer 225 is a cube shaped end of the extension arm 220 that is generally wider than the extension arm 220 such that the spacer 225 protrudes outward from the edge of the extension arm 220 facing inward relative to the junction of the extension arm 220 and the plug portion 221.

In the bottom angular view 293, two snap coupling tabs 227 are shown protruding from the bottom face 228 of the PCB support surface 226. The snap coupling tabs 227 are generally rectangular shaped protuberances protruding from the bottom face 228 at the edge of the face opposite the edge adjoining the rear portion of the plug portion 221. The snap coupling tabs 227 are generally further apart from each other than they are from the lock tabs 229 protruding on either side from the bottom face 228.

Plug portion 221 of press/push flash drive 180 functions substantially the same as end cap 29 of press/push flash drive 10. That is, the plug portion 221 serves to protect the PCBA 26 when it is housed within the metal case 194 from foreign matter and environmental hazards. The PCB support surface 226, which supports PCBA 26 inside of press/push flash drive 180, functions in a similar fashion to the PCB support surface 74 of end cap 29 in that it prevents the PCBA 26 from flexing and/or snapping when pressure is applied to the fingerprint sensor 13. The snap coupling tabs 227 on bottom face 228 lock into metal case 194 in the same manner that snap coupling tabs 75 on bottom surface 77, of end cap 29, lock into metal case 24. Together, PCB support surface 226 and snap coupling tabs 227 firmly retain PCBA 26 within metal case 194 of side-switching press/push flash drive 180. The lock tabs 223 serve to guide the metal case 194 within the housing formed by the connection of the upper housing 186 and the lower housing 184, as discussed later. The switch 181 serves to provide the means by which the user may toggle the side-switching press/push flash drive 180 into the extended position 185 or the retracted position 188. The spacer 225 serves to maintain a gap between extension arm 220 and the metal case 194, resulting in a substantially parallel orientation of the extension arm 220 and the metal case 194.

In an alternative embodiment, the extension arm 220 may be an extrusion of any other geometric shape aside from a rectangular box, such as a cylinder. In alternative embodiments of the present invention, a single guide post 223 (223a or 223b) may be used to provide similar functionality as both guide posts.

Referring now to FIG. 23, a top angular view of the metal case 194 is shown in accordance with an embodiment of the present invention. Metal case 194 is shown to consist of a metal USB plug 12, a top side 230, lateral sides 232, a finger area 231, a fingerprint sensor cutout 237, rectangular notches 233, snap coupling slots 236, a rear opening 234, a squared notch 238, and a bottom face 235. The metal case 194 is made out of metal in an embodiment of the present invention.

As shown in FIG. 23, the metal case 194 is a substantially shaped as a rectangular box with a metal USB plug 12 on one end and a rear opening 234 on the opposing end. Situated about the center of the top face 230 is a finger area 231, which is spanned length wise near the rear opening 234 by a fingerprint sensor cutout 237. The rear opening 234 is substantially similar in both form and function to the rear opening 88 of the metal case 24 of the press/push flash drive 10. The finger area 231 is a generally rectangular depression in the top side 230 with a semi-circular shaped end near the metal USB plug 12 and a squared end near the rear opening 234. The fingerprint sensor cutout 237 is a rectangular shaped cut spanning the width of the metal case 194 on the top side 230 near the rear opening 234. The dimensions of the fingerprint sensor cutout 237 substantially correspond to the dimensions of the fingerprint sensor 13.

In FIG. 23, the lateral sides 232 of the metal case 194 run from the rear opening 234 to the edge of the metal USB plug 12 closest to the rear opening 234. The lateral side 232A has a squared notch 238 cut out at the rear opening 234, as well as a small rectangular notch 233 near the bottom of the lateral side 233 and close to the squared notch 238. The lateral side 232B is substantially similar to the lateral side 232A, but it lacks the squared notch 238. The bottom face 235 of the metal case 194 has two snap coupling slots 236 near the rear opening 234 and aligned horizontally with the rectangular notches 233.

The metal case 194 serves substantially the same function as the metal case 24 of the press/push Flash Drive 10. The metal USB plug 12 is substantially the same as the metal USB plug 12 of the metal case 24 of the press/push flash drive 10. The finger area 231 serves to facilitate the traversal of the user's finger past the fingerprint sensor 13 in order to make use of the same. The fingerprint sensor cutout 237 serves to permit the fingerprint sensor 13 to protrude from the top of the metal case 194, thereby allowing its operation. The rear opening 234 permits the PCBA 26 to slide into the metal case 194, as well as to hold the end cap 199 in place. The snap coupling slots 236 interlock with the snap coupling tabs 227 of the end cap 199 in order to secure the end cap 199 to the metal case 194. The rectangular notches 233 interlock with the lock tabs 229 of the end cap 199 to enhance the connection between the metal case 194 and the end cap 199. The squared notch 238 interlocks with the angled end 224 of the end cap 199 to permit the extension arm 220 to run parallel with the lateral side 232A of the metal case 194.

Referring now to FIG. 24, a top angular view of step 1 of the manufacturing process of the side-switching press/push flash drive 180 is shown in accordance with a method of the present invention. In the first step of the manufacturing process, the PCB support 22 is shown inserted into metal USB plug 12 of the metal case 194.

As shown in FIG. 24, step 1 of the assembly of the side-switching press/push flash drive 180 is substantially the same as step 1 of the assembly of the press/push flash drive 10 shown in FIG. 9, except that the metal case 24 of FIG. 9 is replaced with the metal case 194. As the metal USB plug 12 is identical in both FIG. 9 and FIG. 24, the assembly process and advantages are substantially the same.

Referring now to FIG. 25, a top angular view of step 2 of the manufacturing process of the side-switching press/push flash drive 180 is shown in accordance with a method of the present invention. In the second step of the manufacturing process, the PCBA 26 is shown inserted into the metal case 194.

As shown in FIG. 25, the PCBA 26 is inserted with the leading edge 102 facing into the metal case 194 through the rear opening 234 in the direction of the force 100. The PCBA 26 is completely inserted into the metal case 194 when the leading edge 102 of PCBA 26 covers the top of the PCB support 22 and is generally flush with the outer edge of the metal USB plug 12. Additionally, the fingerprint sensor 13 is exposed through the fingerprint sensor cutout 237 when the PCBA 26 is fully inserted into the metal case 194.

Referring now to FIG. 26, a bottom angular view of step 3 of the manufacturing process of the side-switching press/push flash drive 180 is shown in accordance with a method of the present invention. In the third step of the manufacturing process, the end cap 199 is shown inserted into the metal case 194.

As shown in FIG. 26, the end cap 199 is inserted into the metal case 194 through the rear opening 234 in the direction of force 260. Referring now to FIG. 26, the third assembly step of press/push flash drive 180, in accordance with an embodiment of the present invention, is shown. Plug portion 221 of end cap 199 is inserted into rear opening 234 of metal case 194 in the direction of force 260. Once inserted, the plug end 221 is inserted such that the snap coupling tabs 227 snap into the snap coupling slots 236 in the bottom surface 235 of metal case 194 and the lock tabs 229 interlock with the rectangular notches 233. The squared notch 238 interlocks with the angled end 224 of the end cap 199 to permit the extension arm 220 to run parallel with the lateral side 232A of the metal case 194. The face of the spacer 225 facing the lateral side 232A contacts the same, providing support to the extension arm 220 against the force exerted on the switch 181 when the side-switching press/push flash drive 180 is toggled to the retracted position 188 or the extended position 185.

Referring now to FIG. 27, a top angular view of the slim USB device 270 is shown in accordance with in an embodiment of the present invention. The slim USB device 270 is formed at the completion of step 3, and it is shown to consist of a metal USB plug 12, a metal case 194, an extension arm 220, a PCB support 22, a switch 181, an end cap 199, a fingerprint sensor 13, a finger area 231, lateral side 232A, a flex area 278, and two guide posts 223.

As shown in FIG. 27, the slim USB device 270 is the flash memory device formed at the completion of step 3. Formed in the area between the extension arm 220 and the lateral side 232A of the metal housing 194 is the flex gap 278. When the force 275 is applied by a user to the switch 181, the extension arm 220 flexes inward into the flex gap 278.

Referring now to FIG. 28, a top angular view of step 4 of the manufacturing process of side-switching press/push flash drive 180 is shown in accordance with a method of the present invention. In the fourth step of the manufacturing process, the key ring 18 is attached to the upper housing 186.

As shown in FIG. 28, pin 28 is inserted into the pin aperture 207 in the direction of force 139 with the flanged end 131 of the pin 28 on the end opposing the end inserted through the pin aperture 207 until the flanged end 131 rests generally flush against the rear interior face of the upper housing 186. The key ring hole 132 is a hole of a diameter slightly larger than that of the pin 28 and smaller in diameter than the diameter of the flanged end 131 of the pin 28, thus ensuring that pin 28 cannot be pulled completely through pin aperture 207. Key ring 18 is subsequently threaded through key ring hole 132 in pin 28. The attachment of key ring 18 ensures that pin 28 can not recede into upper housing 186, or the body of the completed side-switching press/push flash drive 180. In an embodiment of the present invention, pin 28 and pin . aperture 207 are round.

The round shape of pin 28 allows for the side-switching press/push flash drive 180 to rotate axially about the pin 28 while attached to, by example, a key chain. This renders the side-switching press/push flash drive 180 easier to handle, and it decreases the likelihood of breaking due to torsion and twisting forces. In alternative embodiments of the present invention, pin 28 and pin aperture 207 may be other shapes that don't allow allow the side-switching press/push flash drive 180 to rotate axially about the pin 28, such as, for example, a triangular, square, or any other geometric shape. Additionally, in alternative embodiments of the present invention, the presence of a key ring may not be desired at all, and pin 28, key ring 132, and pin aperture 207 are not present.

Referring now to FIG. 29, a top angular view of step 5 of the manufacturing process of side-switching press/push flash drive 180 is shown in accordance with a method of the present invention. In the fifth step of the manufacturing process, the slim USB device 270 is inserted into the upper housing 186.

As shown in FIG. 29, the slim USB device 270 is inserted in the direction of force 290 into the bottom of the upper housing 186 such that the metal USB plug 12 is oriented in the same direction as the USB plug opening 202. It is inserted with the lateral side 232A angled downward so as to permit insertion of the switch 181 into the switch slot 209, whereupon the top side 230 of the metal case 194 lays flush against the interior side of the top face 208 within the upper housing 186. The guide post 223A slides into the retracted lock groove 203 when inserted in this step, and the rearward face of the end cap 199 abuts the flanged end 131, substantially preventing the pin 28 from receding into the upper housing 186.

Referring now to FIG. 30, a top angular view of step 6 of the manufacturing process of side-switching press/push flash drive 180 is shown in accordance with a method of the present invention. In the fifth step of the manufacturing process, the upper housing 184 is joined with the lower housing 186, encapsulating the slim USB device 270.

As shown in FIG. 30, the lateral sides of upper housing 186 and lower housing 184 are aligned so that lateral side 200A aligns with the lateral side 210A. The lower housing 184 is joined to the upper housing 186 in the direction of force 300, with the beveled edge of the lateral sides 200 fit within the lateral sides 210. Additionally, the snap coupling slots 205 on upper housing 186 couple with the snap coupling tabs 212 of lower housing 184 in a parallel manner. Snap coupling slot 205a couples with snap coupling tab 212a; snap coupling slot 205b couples with snap coupling tab 212b; Snap coupling slot 205c couples with snap coupling tab 212c; and so on to Snap coupling slot 205h couples with snap coupling tab 212h. When lower housing 184 is attached to the upper housing 186, the guide post 223a seats within the retracted lock groove 213 of the lower housing 184.

In an alternative embodiment of the present invention upper housing 186 and lower housing 184 are permanently cross-linked using ultrasonic press bonding independently of, or in conjunction with, the snap coupling slot/tab method.

Referring now to FIG. 31, a top outline view 295 of side-switching press/push flash drive 180 and a side outline view 296 of side-switching press/push flash drive 180 are shown in accordance with an embodiment of the present invention.

As shown in the top outline view 295, the switch 181 is in the extended position 185. The switch may be moved from the retracted position 188 to the extended position 185 by applying a force in the direction of force 501 on the switch 181 while simultaneously applying a force in the direction of force 503 to the same. When moving into the extended position 185, the guide post 223A slides within the intermediate lock groove 204 until the guide post 223a latches into the extended lock groove 206, and the guide post 223b slides within the intermediate lock groove 214 until the guide post 223b latches into the extended lock groove 216. When in this position, the metal USB plug 12 extends through the USB plug opening 202 and the USB plug opening 218, rendering the side-switching press/push flash drive 180 ready for interfacing with a host device. In this position, the fingerprint sensor 13 is also exposed through the fingerprint cutout area 201 for operation of the same.

As shown in the side outline view 296, the guide post 223a is latched within the extended lock groove 206, and the guide post 223b is shown latched within the extended lock groove 216. In the extended position 185, the guide posts 223 prevent the slim USB device 270 from retreating into the upper housing 186 and the lower housing 184 when a force is applied in the direction of force 315 to the metal USB plug 12, which occurs when the user attempts to interface the side-switching press/push flash drive 180 with a host device.

Referring now to FIG. 32, a top outline view 297 of the side-switching press/push flash drive 180 and a side outline view 298 of the side-switching press/push flash drive 180 are shown in accordance with an embodiment of the present invention.

As shown in the top outline view 297, the switch 181 is in the retracted position 188. The switch may be moved from the extended position 185 to the retracted position 188 by applying a force in the direction of force 501 on the switch 181 while simultaneously applying a force in the direction of force 502 to the same. When moving into the retracted position 188, the guide post 223A slides within the intermediate lock groove 204 until the guide post 223a latches into the retracted lock groove 203, and the guide post 223b slides within the intermediate lock groove 214 until the guide post 223b latches into the retracted lock groove 213. When in this position, the metal USB plug 12 is enshrouded within the upper housing 186 and the lower housing 184, protecting the metal USB plug 12 from environmental damage. In this position, the fingerprint sensor 13 is also enshrouded within the upper housing a 186 and the lower housing 184, protecting it from environmental damage.

As shown in the side outline view 298, the guide post 223a is latched within the retracted lock groove 203, and the guide post 223b is shown latched within the retracted lock groove 213. In the retracted position 188, the guide posts 223 prevent the slim USB device 270 from sliding freely within the upper housing 186 and the lower housing 184. This prevents the metal USB plug 12 from damage or wear due to inadvertent exposure during storage or transportation of the side-switching press/push flash drive 180.

Referring now to FIG. 33, a side-switching press/push flash drive without fingerprint sensor 330 is shown to include a metal USB plug 12, an upper housing 332, a lower housing 184, a switch 181, and a slot 336, in accordance with an alternate embodiment of the present invention.

The metal USB plug 12 is substantially similar to the metal USB plug 12 described earlier. The upper housing 332 is a rectangular shaped box with a concave interior, and it is joined to the lower housing 184, which is substantially similar to the lower housing 184 described earlier. The upper housing 332 joins with the lower housing 184 in a manner substantially similar to the connection of the upper housing 186 and the lower housing 184 described earlier. The internals of the side-switching press/push flash drive without fingerprint sensor 330 are substantially similar to those of the 180, as described earlier. The internals are not further discussed to avoid duplicative description. The switch 181 is substantially similar to the switch 181 described earlier, and it protrudes from a slot 336 on the lateral sides of the upper housing 332 and the lower housing 184.

The side-switching press/push flash drive without fingerprint sensor 330 is substantially similar to the side-switching press/push flash drive 180 in form and function. However, the side-switching press/push flash drive without fingerprint sensor 330 lacks the fingerprint sensor 13 of the side-switching press/push flash drive 180, thereby permitting the installation of an upper housing 332 with a solid rectangular face.

Although the present invention has been described in terms of specific embodiment, it is anticipated that alterations and modifications thereof will no doubt become apparent to those more skilled in the art. It is therefore intended that the following claims be interpreted as covering all such alterations and modification as fall within the true spirit and scope of the invention.

What is claimed is:

1. A press/push flash drive comprising:

a metal case with openings on two opposing ends, where one end assists interfacing the press/push flash drive with an electronic device, the metal case having a conformation of a substantially rectangular extrusion with a top surface, bottom surface, and two lateral sides, the top surface containing a press/push button and lock tabs;

a printed circuit board (PCB) support coupled to said opening of the metal case that helps interface the press/push flash drive with an electronic device, the PCB support secured to the metal case and located substantially within said opening;

a printed circuit board assembly (PCBA) with a set of interface pins located on one end of the PCBA, the PCBA located substantially inside the metal case, and said end of the PCBA with interface pins coupled to the PCB support;

an end cap coupled with said opening of the metal case without the PCB support coupled therein, the end cap being coupled to the PCBA within the metal case, and the end cap further securing the PCBA within the metal case;

an upper housing with a top surface and lateral sides descending from said top surface, a fingerprint area cutout substantially central to said top surface, a front opening located within one of said lateral sides, and deployed lock grooves and retracted lock grooves formed on the inside of the top surface, the deployed lock grooves located closer to the front opening than the retracted lock grooves; and a lower housing with a bottom surface and lateral sides descending from said bottom surface, a front opening located within one of said lateral sides, the lower housing coupled with said upper housing, together the upper housing and lower housing thereby containing within, the metal case, the PCBA, the PCB support, and the end cap, with the front openings of the upper housing and lower housing aligned, forming an opening on one end of the coupled housings;

wherein pressing and pushing said press/push button of the metal case in the direction of the opening on one end of the housings extends a metal interface plug for interfacing the press/push flash drive with an electronic device and said lock tabs of the metal case become secured within said deployed lock grooves of the upper housing, and pressing and pushing said press/push button in the direction opposite of the opening on one end of the housings retracts the metal interface plug and said lock tabs of the metal case become secured within said retracted lock grooves of the upper housing.

2. The press/push flash drive of claim 1, wherein the metal interface plug extended by the movement of the press/push button is a metal USB plug.

3. The press/push flash drive of claim 2, wherein the metal case further includes slide-thru support tabs on said lateral sides.

4. The press/push flash drive of claim 2, wherein the metal case includes a finger print sensor cutout formed therein.

5. The press/push flash drive of claim 2, wherein the PCBA is comprised of chip on board (COB) or surface mount technology (SMT) electronic devices.

6. The press/push flash drive of claim 4, wherein a fingerprint sensor is included on the PCBA, the fingerprint sensor protruding through the fingerprint sensor cutout of the metal case, and accessible to the user through the fingerprint area cutout of the upper housing when the metal USB plug is extended, and hidden beneath the upper housing when the metal USB plug is retracted.

7. The press/push flash drive of claim 5, wherein the upper and lower housings are comprised substantially of a resilient plastic, and are coupled to each other using snap coupling tabs and snap coupling slots.

8. The press/push flash drive of claim 5, wherein the upper and lower housings are comprised substantially of a resilient plastic, and are coupled to each other using ultrasonic press method.

9. The press/push flash drive of claim 5, wherein the upper and lower housings are comprised substantially of a resilient plastic, and are coupled to each other using an epoxy.

10. The press/push flash drive of claim 4, wherein the upper and lower housings each have a pin hole formed within one of their complimentary lateral sides, within which a pin is coupled, and a keychain ring is thereby coupled to said pin.

11. A side-switching press/push flash drive comprising:
a metal case with openings on two opposing ends, where one end assists interfacing the press/push flash drive with an electronic device, the metal case having a conformation of a substantially rectangular extrusion with a top surface, bottom surface, and two lateral sides;
a printed circuit board (PCB) support coupled to said opening of the metal case that helps interface the press/push flash drive with an electronic device, the PCB support secured to the metal case and located substantially within said opening;
a printed circuit board assembly (PCBA) with a set of interface pins located on one end of the PCBA, the PCBA located substantially inside the metal case, and said end of the PCBA with interface pins coupled to the PCB support;
an end cap coupled with said opening of the metal case without the PCB support coupled therein, the end cap being coupled to the PCBA within the metal case and securing the PCBA within the metal case, the end cap further having an extension arm with one or more lock tabs and a side-switch located thereon;
an upper housing with a top surface and lateral sides descending from said top surface, a fingerprint area cutout substantially central to said top surface, a front opening located within one of said lateral sides, a slot cutout for said side-switch of said extension arm of the end cap in one of said lateral, a deployed lock groove, an intermediate groove, and a retracted lock groove formed on the inside of the top surface, the deployed lock groove located closer to the front opening than the retracted lock groove; and
a lower housing with a bottom surface and lateral sides descending from said bottom surface, a front opening located within one of said lateral sides, a slot cutout for said side-switch of said extension arm of the end cap in one of said lateral sides, the lower housing coupled with said upper housing, together the upper housing and lower housing thereby containing within, the metal case, the PCBA, the PCB support, and the end cap, with the front openings of the upper housing and lower housing aligned, forming an interface opening on one end of the coupled housings;
wherein pressing and pushing said side-switch button of the end cap in the direction of said interface opening extends a metal interface plug for interfacing the press/push flash drive with an electronic device and said one or more lock tabs of the end cap become secured within said deployed lock groove of the upper housing, and pressing and pushing said side-switch in the direction opposite of said interface opening retracts the metal interface plug and said lock tabs of the end cap become secured within said retracted lock groove of the upper housing.

12. The side-switching press/push flash drive of claim 11, wherein a deployed lock groove, an intermediate groove, and a retracted lock groove are also formed on the inside of the bottom surface of the lower housing, and the deployed lock groove, intermediate groove, and retracted lock groove of the lower housing mirror the deployed lock groove, intermediate groove, and retracted lock groove of the upper housing, respectively, wherein lock tabs on the extension arm of the end cap interface with the deployed lock grooves, intermediate grooves, and retracted lock grooves of both the upper and lower housings when the metal interface plug is extended and retracted by press and pushing the side-switch of the end cap.

13. The side-switching press/push flash drive of claim 12, wherein the metal interface plug extended by the movement of the press/push button is a metal USB plug.

14. The side-switching press/push flash drive of claim 12, wherein the metal case further includes slide-thru support tabs on said lateral sides.

15. The side-switching press/push flash drive of claim 12, wherein the metal case includes a finger print sensor cutout formed therein.

16. The side-switching press/push flash drive of claim 12, wherein the PCBA is comprised of chip on board (COB) or surface mount technology (SMT) electronic devices.

17. The side-switching press/push flash drive of claim 15, wherein a fingerprint sensor is included on the PCBA, the fingerprint sensor protruding through the fingerprint sensor cutout of the metal case, and accessible to the user through the fingerprint area cutout of the upper housing when the metal USB plug is extended, and hidden beneath the upper housing when the metal USB plug is retracted.

18. The side-switching press/push flash drive of claim 15, wherein the upper and lower housings are comprised substantially of a resilient plastic, and are coupled to each other using snap coupling tabs and snap coupling slots.

19. The side-switching press/push flash drive of claim 15, wherein the upper and lower housings are comprised substantially of a resilient plastic, and are coupled to each other using ultrasonic press method.

20. The side-switching press/push flash drive of claim 15, wherein the upper and lower housings are comprised substantially of a resilient plastic, and are coupled to each other using an epoxy.

21. The side-switching press/push flash drive of claim 15, wherein said extension arm of the end cap has two lock tabs, the lock tabs protruding substantially in the direction of 180- degrees from each other each other and perpendicular to the top surface of the upper housing and the bottom surface of the bottom housing.

22. The side-switching press/push flash drive of claim 14, wherein the upper and lower housings each have a pin hole formed within one of their complimentary lateral sides, within which a pin is coupled, and a keychain ring is thereby coupled to said pin.

* * * * *